(12) United States Patent
Runser

(10) Patent No.: US 12,413,177 B2
(45) Date of Patent: Sep. 9, 2025

(54) PHOTOVOLTAIC MODULES AND ROOFING SHINGLES WITH NAIL ZONES

(71) Applicant: GAF Energy LLC, Parsippany, NJ (US)

(72) Inventor: Rory Runser, Palo Alto, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/819,476

(22) Filed: Aug. 29, 2024

(65) Prior Publication Data

US 2025/0080037 A1 Mar. 6, 2025

Related U.S. Application Data

(60) Provisional application No. 63/579,858, filed on Aug. 31, 2023.

(51) Int. Cl.
*E04D 1/34* (2006.01)
*H02S 20/25* (2014.01)

(52) U.S. Cl.
CPC ............. *H02S 20/25* (2014.12); *E04D 1/34* (2013.01); *E04D 2001/3423* (2013.01)

(58) Field of Classification Search
CPC ............. E04D 1/34; E04D 2001/3423; E04D 2001/3452; E04D 2001/3458; E04D 2001/3467; E04D 2001/3491; H02S 20/25
See application file for complete search history.

(56) References Cited

U.S. PATENT DOCUMENTS

| 1,981,467 A | 11/1934 | Radtke |
| 3,156,497 A | 11/1964 | Lessard |
| 3,581,779 A | 6/1971 | Gilbert, Jr. |

(Continued)

FOREIGN PATENT DOCUMENTS

| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Adriana Figueroa
(74) *Attorney, Agent, or Firm* — GREENBERG TRAURIG, LLP

(57) ABSTRACT

A system, including: a roof deck; a plurality of photovoltaic modules installed on the roof deck, each of the plurality of photovoltaic modules having: a solar cell, and a backsheet, where the solar cell is positioned on the backsheet, where the backsheet has a headlap portion, where the headlap portion has a first longitudinal groove and a second longitudinal groove, where the first longitudinal groove is spaced apart from the second longitudinal groove on the backsheet, to define a nail zone between the first longitudinal groove and the second longitudinal groove; and a plurality of fasteners installed so as to penetrate the nail zones of the plurality of photovoltaic modules and the roof deck.

20 Claims, 12 Drawing Sheets

(56) References Cited

U.S. PATENT DOCUMENTS

| | | | |
|---|---|---|---|
| 3,927,501 A * | 12/1975 | Allen | E04D 1/26 52/555 |
| 4,258,948 A | 3/1981 | Hoffmann | |
| 4,349,220 A | 9/1982 | Carroll et al. | |
| 4,499,702 A | 2/1985 | Turner | |
| 4,636,577 A | 1/1987 | Peterpaul | |
| 5,167,579 A | 12/1992 | Rotter | |
| 5,224,318 A * | 7/1993 | Kemerer | E04F 13/0864 52/546 |
| 5,437,735 A | 8/1995 | Younan et al. | |
| 5,590,495 A | 1/1997 | Bressler et al. | |
| 5,642,596 A | 7/1997 | Waddington | |
| 6,008,450 A | 12/1999 | Ohtsuka et al. | |
| 6,033,270 A | 3/2000 | Stuart | |
| 6,046,399 A | 4/2000 | Kapner | |
| 6,199,338 B1 * | 3/2001 | Hudson, Jr. | E04D 1/29 52/518 |
| 6,201,180 B1 | 3/2001 | Meyer et al. | |
| 6,220,329 B1 | 4/2001 | King et al. | |
| 6,308,482 B1 | 10/2001 | Strait | |
| 6,320,114 B1 | 11/2001 | Kuechler | |
| 6,320,115 B1 | 11/2001 | Kataoka et al. | |
| 6,336,304 B1 | 1/2002 | Mimura et al. | |
| 6,341,454 B1 | 1/2002 | Koleoglou | |
| 6,407,329 B1 | 6/2002 | Iino et al. | |
| 6,576,830 B2 | 6/2003 | Nagao et al. | |
| 6,928,781 B2 | 8/2005 | Desbois et al. | |
| 6,972,367 B2 | 12/2005 | Federspiel et al. | |
| 6,990,779 B2 * | 1/2006 | Kiik | B32B 13/14 52/518 |
| 7,138,578 B2 | 11/2006 | Komamine | |
| 7,155,870 B2 | 1/2007 | Almy | |
| 7,178,295 B2 | 2/2007 | Dinwoodie | |
| 7,487,771 B1 | 2/2009 | Eiffert et al. | |
| 7,587,864 B2 | 9/2009 | McCaskill et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Podirsky | |
| 7,832,176 B2 | 11/2010 | McCaskill et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,210,570 B1 | 7/2012 | Railkar et al. | |
| 8,276,329 B2 | 10/2012 | Lenox | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 | 4/2013 | Shiao et al. | |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 | 8/2013 | Geary | |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,601,754 B2 | 12/2013 | Jenkins et al. | |
| 8,629,578 B2 | 1/2014 | Kurs et al. | |
| 8,646,228 B2 | 2/2014 | Jenkins | |
| 8,656,657 B2 | 2/2014 | Livsey et al. | |
| 8,671,630 B2 | 3/2014 | Lena et al. | |
| 8,677,702 B2 | 3/2014 | Jenkins | |
| 8,695,289 B2 | 4/2014 | Koch et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,776,455 B2 | 7/2014 | Azoulay | |
| 8,789,321 B2 | 7/2014 | Ishida | |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,863,451 B2 | 10/2014 | Jenkins et al. | |
| 8,898,970 B2 | 12/2014 | Jenkins et al. | |
| 8,925,262 B2 | 1/2015 | Railkar et al. | |
| 8,943,766 B2 | 2/2015 | Gombarick et al. | |
| 8,946,544 B2 | 2/2015 | Jabos et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,966,850 B2 | 3/2015 | Jenkins et al. | |
| 8,994,224 B2 | 3/2015 | Mehta et al. | |
| 9,032,672 B2 | 5/2015 | Livsey et al. | |
| 9,153,950 B2 | 10/2015 | Yamanaka et al. | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,270,221 B2 | 2/2016 | Zhao | |
| 9,273,885 B2 | 3/2016 | Rodrigues et al. | |
| 9,276,141 B2 | 3/2016 | Kalkanoglu et al. | |
| 9,331,224 B2 | 5/2016 | Koch et al. | |
| 9,356,174 B2 | 5/2016 | Duarte et al. | |
| 9,359,014 B1 | 6/2016 | Yang et al. | |
| 9,412,890 B1 | 8/2016 | Meyers | |
| 9,528,270 B2 | 12/2016 | Jenkins et al. | |
| 9,605,432 B1 | 3/2017 | Robbins | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 9,998,067 B2 | 6/2018 | Kalkanoglu et al. | |
| 10,027,273 B2 | 7/2018 | West et al. | |
| 10,115,850 B2 | 10/2018 | Rodrigues et al. | |
| 10,128,660 B1 | 11/2018 | Apte et al. | |
| 10,156,075 B1 | 12/2018 | McDonough | |
| 10,187,005 B2 | 1/2019 | Rodrigues et al. | |
| 10,256,765 B2 | 4/2019 | Rodrigues et al. | |
| 10,284,136 B1 | 5/2019 | Mayfield et al. | |
| 10,454,408 B2 | 10/2019 | Livsey et al. | |
| 10,530,292 B1 | 1/2020 | Cropper et al. | |
| 10,560,048 B2 | 2/2020 | Fisher et al. | |
| 10,563,406 B2 | 2/2020 | Kalkanoglu et al. | |
| D879,031 S | 3/2020 | Lance et al. | |
| 10,579,028 B1 | 3/2020 | Jacob | |
| 10,784,813 B2 | 9/2020 | Kalkanoglu et al. | |
| D904,289 S | 12/2020 | Lance et al. | |
| 11,012,026 B2 | 5/2021 | Kalkanoglu et al. | |
| 11,085,187 B2 * | 8/2021 | Grubka | E04D 1/20 |
| 11,177,639 B1 | 11/2021 | Nguyen et al. | |
| 11,217,715 B2 | 1/2022 | Sharenko et al. | |
| 11,251,744 B1 | 2/2022 | Bunea et al. | |
| 11,258,399 B2 | 2/2022 | Kalkanoglu et al. | |
| 11,283,394 B2 | 3/2022 | Perkins et al. | |
| 11,309,828 B2 | 4/2022 | Sirski et al. | |
| 11,394,344 B2 | 7/2022 | Perkins et al. | |
| 11,424,379 B2 | 8/2022 | Sharenko et al. | |
| 11,431,280 B2 | 8/2022 | Liu et al. | |
| 11,431,281 B2 | 8/2022 | Perkins et al. | |
| 11,444,569 B2 | 9/2022 | Clemente et al. | |
| 11,454,027 B2 | 9/2022 | Kuiper et al. | |
| 11,459,757 B2 | 10/2022 | Nguyen et al. | |
| 11,486,144 B2 | 11/2022 | Bunea et al. | |
| 11,489,482 B2 * | 11/2022 | Peterson | H01L 31/0481 |
| 11,496,088 B2 | 11/2022 | Sirski et al. | |
| 11,508,861 B1 | 11/2022 | Perkins et al. | |
| 11,512,480 B1 | 11/2022 | Achor et al. | |
| 11,527,665 B2 | 12/2022 | Boitnott | |
| 11,545,927 B2 | 1/2023 | Abra et al. | |
| 11,545,928 B2 | 1/2023 | Perkins et al. | |
| 11,658,470 B2 | 5/2023 | Nguyen et al. | |
| 11,661,745 B2 | 5/2023 | Bunea et al. | |

(56) References Cited

U.S. PATENT DOCUMENTS

| | | |
|---|---|---|
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 11,927,014 B2 * | 3/2024 | Graziano .................. E04D 1/20 |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Fath |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 * | 12/2010 | Degenfelder ............ E04D 1/30 52/173.3 |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 244648 A2 | 5/2012 |
| EP | 2784241 A1 | 10/2014 |

(56) References Cited

FOREIGN PATENT DOCUMENTS

| | | |
|---|---:|---:|
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.
Tesla, Solar Roof <<tesla.com/solarroof>> retrieved Feb. 2, 2021.
"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

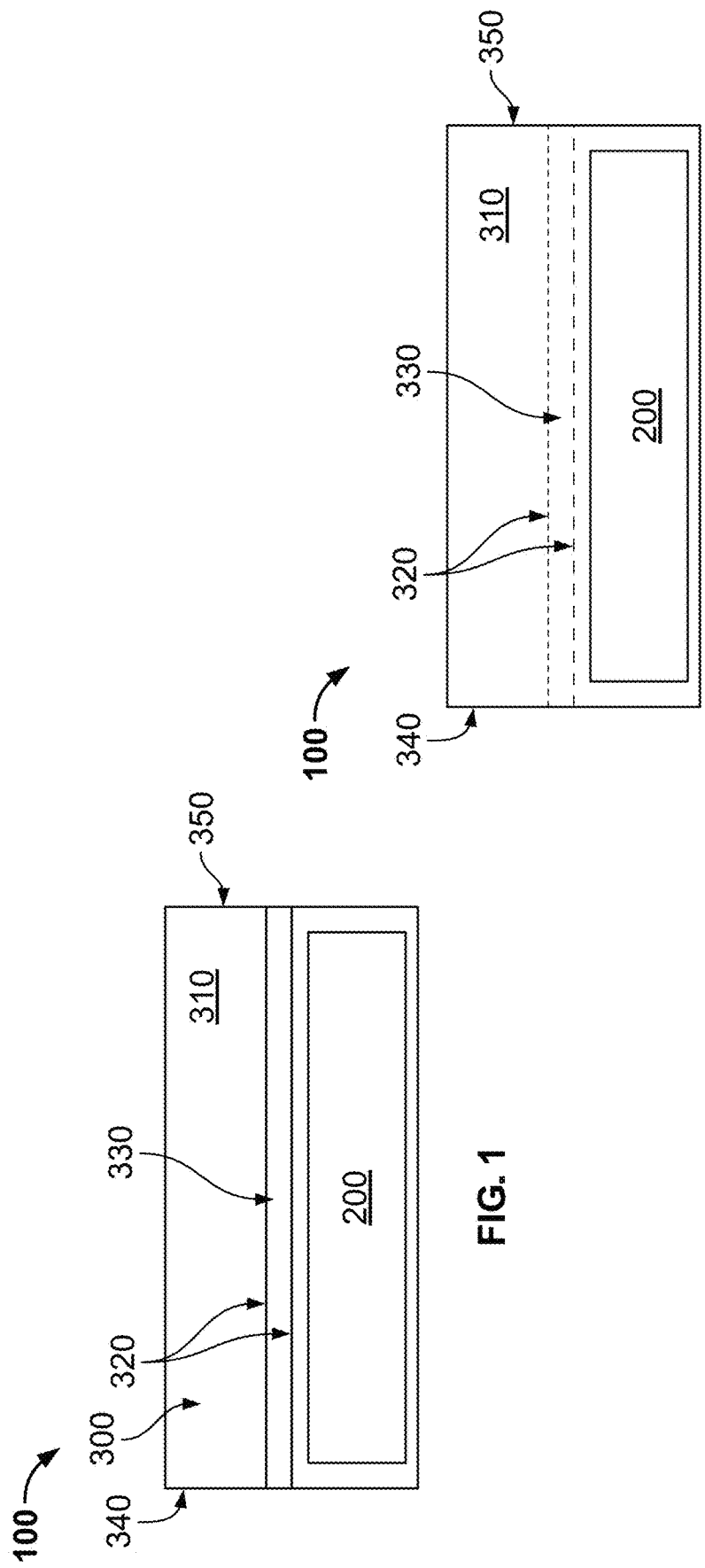

PHOTOVOLTAIC MODULES AND ROOFING SHINGLES WITH NAIL ZONES

CROSS-REFERENCE TO RELATED APPLICATIONS

This application is a Section 111(a) application relating to and claiming the benefit of commonly-owned, U.S. Provisional Patent Application Ser. No. 63/579,858, filed Aug. 31, 2023, entitled "ROOFING MODULE, AND ASSOCIATED SYSTEM AND METHOD," the contents of which are incorporated herein by reference in its entirety.

FIELD

The present invention relates to roofing modules including photovoltaic modules and roofing shingles and, more particularly, photovoltaic modules and roofing shingles with nail zones.

BACKGROUND

In a roofing system, a technician may install a number of roofing modules, including both photovoltaic modules and non-photovoltaic modules, above a roof deck. For example, the technician may fasten a number of fasteners through a nail zone of each of the roofing modules, and into the roof deck.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, a system includes a plurality of photovoltaic modules installed on a roof deck, each of the plurality of photovoltaic modules comprising at least one solar cell, and a backsheet, wherein the at least one solar cell is above the backsheet, and wherein the backsheet includes a headlap portion, wherein the headlap portion comprises a first longitudinal groove and a second longitudinal groove, wherein the first longitudinal groove is spaced apart from the second longitudinal groove to define a nail zone between the first longitudinal groove and the second longitudinal groove, and wherein each of the photovoltaic modules is configured to receive at least one fastener within the nail zone for installing the photovoltaic module to the roof deck.

In some embodiments, a depth of at least one of the first longitudinal groove or the second longitudinal groove is 0.1 mm to 0.2 mm. In some embodiments, a width of the nail zone between the first longitudinal groove and the second longitudinal groove is 3 cm to 6 cm. In some embodiments, each of the first longitudinal groove and the second longitudinal groove extends from one end of the backsheet to an opposite end of the backsheet.

In some embodiments, the backsheet is composed of thermoplastic polyolefin (TPO). In some embodiments, the headlap portion an integral portion of the backsheet. In some embodiments, the backsheet includes a base portion, and wherein the headlap portion is attached to the base portion. In some embodiments, the at least one solar cell and the base portion are laminated, and wherein the headlap portion is not laminated. In some embodiments, the headlap portion does not include a pigment.

In some embodiments, a photovoltaic module includes at least one solar cell, and a backsheet, wherein the at least one solar cell is above the backsheet, wherein the backsheet comprises a headlap portion, wherein the headlap portion comprises a first longitudinal groove and a second longitudinal groove, wherein the first longitudinal groove is spaced apart from the second longitudinal groove on the backsheet to define a nail zone between the first longitudinal groove and the second longitudinal groove, and wherein the nail zone is configured to receive at least one fastener that penetrates the photovoltaic module to secure the photovoltaic module to a roof deck.

In some embodiments, the backsheet comprises thermoplastic polyolefin (TPO). In some embodiments, a depth of at least one of the first longitudinal groove or the second longitudinal groove is 0.1 mm to 0.2 mm. In some embodiments, a width of the nail zone between the first longitudinal groove and the second longitudinal groove is 3 cm to 6 cm. In some embodiments, each of the first longitudinal groove and the second longitudinal groove extends from one end of the backsheet to an opposite end of the backsheet. In some embodiments, the headlap portion an integral portion of the backsheet. In some embodiments, the backsheet includes a base portion, and wherein the headlap portion is attached to the base portion. In some embodiments, the at least one solar cell and the base portion are laminated, and wherein the headlap portion is not laminated. In some embodiments, the headlap portion does not include a pigment.

In some embodiments, a method comprises obtaining a first sheet; forming a first longitudinal groove in the first sheet; forming a second longitudinal groove in the first sheet, the first longitudinal groove spaced apart from the second longitudinal groove to define a first nail zone between the first longitudinal groove and the second longitudinal groove; forming a third longitudinal groove in the first sheet; forming a fourth longitudinal groove in the first sheet, the third longitudinal groove spaced apart from the fourth longitudinal groove to define a second nail zone between the third longitudinal groove and the fourth longitudinal groove, wherein the first nail zone is spaced apart from the second nail zone; cutting the sheet to form a first backsheet and a second backsheet, wherein the first backsheet includes the first nail zone, and wherein the second backsheet includes the second nail zone; and laminating a first solar cell with the first backsheet to form a first photovoltaic module, wherein the first photovoltaic module includes a headlap portion, and wherein the first nail zone is on the headlap portion.

In some embodiments, the method further includes laminating a second solar cell with the second backsheet to form a second photovoltaic module, wherein the second photovoltaic module includes a headlap portion, and where the second nail zone is on the headlap portion of the second photovoltaic module.

In some embodiments, the forming the first longitudinal groove and the forming the second longitudinal groove occur simultaneously. In some embodiments, the forming the first longitudinal groove occurs before the forming the second longitudinal groove.

In some embodiments, the forming the third longitudinal groove and the forming the fourth longitudinal groove occur simultaneously. In some embodiments, the forming the third longitudinal groove occurs before the forming the fourth longitudinal groove.

In some embodiments, the forming the first longitudinal groove, the forming the second longitudinal groove, the forming of the third longitudinal groove, and the forming of the fourth longitudinal groove occur simultaneously. In some embodiments, the forming the first longitudinal groove, the forming the second longitudinal groove, the forming of the third longitudinal groove, and/or the forming of the fourth longitudinal groove occurs at different periods.

BRIEF DESCRIPTION OF THE FIGURES

This section refers to the drawings that form a part of this disclosure, and which illustrate some of the embodiments of structure, materials, and/or methods of the present invention described herein.

FIG. 1 is a schematic top view of a roofing module, in accordance with some embodiments of the invention.

FIG. 2 is a schematic top view of a roofing module, in accordance with some embodiments of the invention.

DETAILED DESCRIPTION

Figure 3:
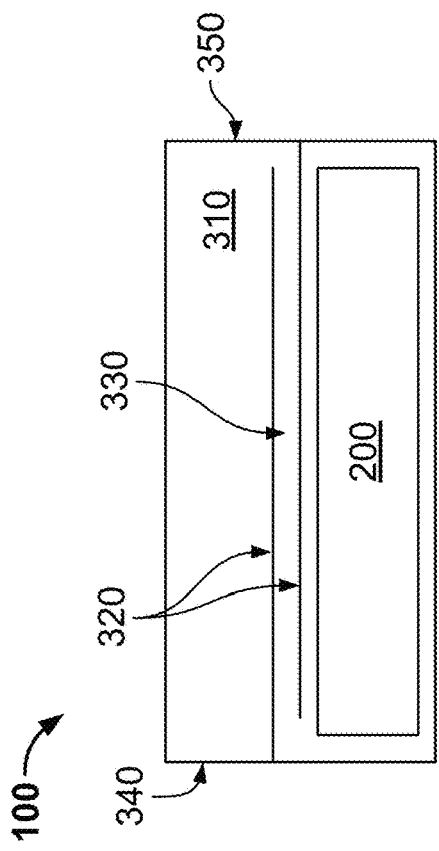
FIG. 3 is a schematic top view of a roofing module, in accordance with some embodiments of the invention.

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure is intended to be illustrative, and not restrictive.

As used herein, a "steep slope" roof or roof deck is a roof or roof deck having a pitch of Y/X, where Y and X are in a ratio of 4:12 to 20:12, where Y corresponds to the "rise" of the roof or roof deck, and where X corresponds to the "run" of the roof or roof deck.

As used herein, a "sloped" roof or roof deck is a roof or roof deck that is not flat, but has a pitch that is less than the pitch of a steep slope roof or roof deck.

As used herein, a "flat" roof or roof deck is a roof or roof deck that is substantially flat.

In some embodiments, the present invention provides a roofing module comprising a pair of grooves defining a nail zone therebetween.

In some embodiments, the grooves comprise a pair of longitudinal grooves. In some embodiments, the longitudinal grooves are spaced apart from one another, thereby defining the nail zone.

In some embodiments, the roofing module comprises a photovoltaic module. In some embodiments, the roofing module is a photovoltaic module shown and described in either or both of U.S. application Ser. No. 17/831,307, filed Jun. 2, 2022, titled "Roofing Module System," and published under U.S. Patent Application Publication No. 2022-0393637 on Dec. 8, 2022; and/or U.S. application Ser. No. 18/169,718, filed Feb. 15, 2023, titled "Roofing Module System," and published under U.S. Patent Application Publication No. 2023-0203815 on Jun. 29, 2023, the disclosures of each of which are incorporated by reference herein in their entireties. In some embodiments, the photovoltaic module includes a structure, composition, components, and/or function similar to those of one or more embodiments of the photovoltaic modules and shingles disclosed in PCT International Patent Publication No. WO 2022/051593, Application No. PCT/US2021/049017, published Mar. 10, 2022, titled "Building Integrated Photovoltaic System," owned by GAF Energy LLC; U.S. Pat. No. 11,251,744 to Bunea et al., issued Feb. 15, 2022, titled "Photovoltaic Shingles and Methods of Installing Same, owned by GAF Energy LLC;" and U.S. Pat. No. 11,870,227, issued Jan. 9, 2024, entitled "Building Integrated Photovoltaic System," owned by GAF Energy LLC, the disclosures of each of which are incorporated by reference herein in their entireties.

In some embodiments, the roofing module is a non-photovoltaic module. In some embodiments, the non-photovoltaic module is a cuttable roofing module. In some embodiments, the roofing module includes a cap layer and a core layer. In some embodiments, the cuttable roofing module, the cap layer, and/or the core layer, are as shown and described in U.S. application Ser. No. 17/831,307, filed Jun. 2, 2022, titled "Roofing Module System," and published under U.S. Patent Application Publication No. 2022-0393637 on Dec. 8, 2022, owned by GAF Energy LLC; U.S. application Ser. No. 18/169,718, filed Feb. 15, 2023, titled "Roofing Module System," and published under U.S. Patent Application Publication No. 2023-0203815 on Jun. 29, 2023, owned by GAF Energy LLC; and/or U.S. application Ser. No. 18/352,894, filed Jul. 14, 2023, titled "Solar Roofing System with Fiber Composite Roofing Shingles," owned by GAF Energy LLC, the disclosures of each of which are incorporated by reference herein in their entireties.

In some embodiments, the photovoltaic module comprises at least one solar cell. In some embodiments, the at least one solar cell is electrically active—that is, the solar cell and/or associated electronics convert light, such as sunlight, into electricity by the photovoltaic effect. In some embodiments, the at least one solar cell is electrically inactive—that is, the solar cell and/or associated electronics do not convert light into electricity.

In some embodiments, one or more of the solar cells of the photovoltaic module are electrically active. In some embodiments, all of the solar cells of the photovoltaic module are electrically active. In some embodiments, one or more of the solar cells of the photovoltaic module are electrically inactive. In some embodiments, all of the solar cells of the photovoltaic module are electrically inactive. In some embodiments, at least one of the solar cells of the photovoltaic module is active while at least one of the solar cells of the photovoltaic module is electrically inactive.

In some of the embodiments, the solar cells of the roofing module are positioned above a backsheet. In some embodiments, the solar cells are laminated to the backsheet. In some embodiments, the backsheet comprises one or more of ethylene propylene diene monomer (EPDM) rubber, polymethyl methacrylate (PMMA), polyethylene terephthalate (PET), ethylene tetrafluoroethylene (ETFE), thermoplastic polyolefin (TPO), and/or combinations of two or more thereof.

In some embodiments, the backsheet is a single layer. In some embodiments, the backsheet is multiple layers.

In some embodiments, the groove or grooves are formed on a cap layer. In some embodiments, the groove or grooves are formed on the cap layer, which is on a core layer.

In some embodiments, the roofing module is configured to be installed above a roof deck with one or more fasteners. In some embodiments, the fasteners comprise one or more of nails, screws, staples, rivets, and/or combinations thereof.

In some embodiments, the backsheet comprises a headlap portion. In some embodiments, the headlap portion defines the nail zone. In some embodiments, the headlap portion defines the nail zone between the longitudinal grooves that are formed on the backsheet.

In some embodiments, the headlap portion comprises a first longitudinal groove, and a second longitudinal groove spaced apart from the first longitudinal groove on the backsheet, thereby to define the nail zone between the first longitudinal groove and the second longitudinal groove. In some embodiments, the nail zone is configured to receive at least one fastener that penetrates the backsheet of the photovoltaic module when the photovoltaic module is installed above the roof deck in a roofing system, as well as the roof deck, thereby to secure the photovoltaic module to the roof deck.

In some embodiments, a depth of at least one of the first longitudinal groove and/or the second longitudinal groove is 0.01 mm. In some embodiments, the depth is 0.05 mm. In some embodiments, the depth is 0.1 mm. In some embodiments, the depth is 0.2 mm. In some embodiments, the depth is 0.3 mm. In some embodiments, the depth is 0.4 mm. In some embodiments, the depth is 0.5 mm. In some embodiments, the depth is 0.6 mm. In some embodiments, the depth is 0.7 mm. In some embodiments, the depth is 0.8 mm. In some embodiments, the depth is 0.9 mm. In some embodiments, the depth is 1.0 mm. In some embodiments, the depth is 1.1 mm. In some embodiments, the depth is 1.2 mm. In some embodiments, the depth is 1.3 mm. In some embodiments, the depth is 1.4 mm. In some embodiments, the depth is 1.5 mm. In some embodiments, the depth is 1.6 mm. In some embodiments, the depth is 1.7 mm. In some embodiments, the depth is 1.8 mm. In some embodiments, the depth is 1.9 mm. In some embodiments, the depth is 2.0 mm. In some embodiments, the depth is 3.0 mm. In some embodiments, the depth is 4.0 mm. In some embodiments, the depth is 5.0 mm.

In some embodiments, the depth is more than 0.01 mm. In some embodiments, the depth is more than 0.05 mm. In some embodiments, the depth is more than 0.1 mm. In some embodiments, the depth is more than 0.2 mm. In some embodiments, the depth is more than 0.3 mm. In some embodiments, the depth is more than 0.4 mm. In some embodiments, the depth is more than 0.5 mm. In some embodiments, the depth is more than 0.6 mm. In some embodiments, the depth is more than 0.7 mm. In some embodiments, the depth is more than 0.8 mm. In some embodiments, the depth is more than 0.9 mm. In some embodiments, the depth is more than 1.0 mm. In some embodiments, the depth is more than 1.1 mm. In some embodiments, the depth is more than 1.2 mm. In some embodiments, the depth is more than 1.3 mm. In some embodiments, the depth is more than 1.4 mm. In some embodiments, the depth is more than 1.5 mm. In some embodiments, the depth is more than 1.6 mm. In some embodiments, the depth is more than 1.7 mm. In some embodiments, the depth is more than 1.8 mm. In some embodiments, the depth is more than 1.9 mm. In some embodiments, the depth is more than 2.0 mm. In some embodiments, the depth is more than 3.0 mm. In some embodiments, the depth is more than 4.0 mm. In some embodiments, the depth is more than 5.0 mm.

In some embodiments, the depth is less than 0.01 mm. In some embodiments, the depth is less than 0.05 mm. In some embodiments, the depth is less than 0.1 mm. In some embodiments, the depth is less than 0.2 mm. In some embodiments, the depth is less than 0.3 mm. In some embodiments, the depth is less than 0.4 mm. In some embodiments, the depth is less than 0.5 mm. In some embodiments, the depth is less than 0.6 mm. In some embodiments, the depth is less than 0.7 mm. In some embodiments, the depth is less than 0.8 mm. In some embodiments, the depth is less than 0.9 mm. In some embodiments, the depth is less than 1.0 mm. In some embodiments, the depth is less than 1.1 mm. In some embodiments, the depth is less than 1.2 mm. In some embodiments, the depth is less than 1.3 mm. In some embodiments, the depth is less than 1.4 mm. In some embodiments, the depth is less than 1.5 mm. In some embodiments, the depth is less than 1.6 mm. In some embodiments, the depth is less than 1.7 mm. In some embodiments, the depth is less than 1.8 mm. In some embodiments, the depth is less than 1.9 mm. In some embodiments, the depth is less than 2.0 mm. In some embodiments, the depth is less than 3.0 mm. In some embodiments, the depth is less than 4.0 mm. In some embodiments, the depth is less than 5.0 mm In some embodiments, the depth is 0.01 mm to 5.0 mm. In some embodiments, the depth is 0.05 mm to 5.0 mm. In some embodiments, the depth is 0.1 mm to 5.0 mm. In some embodiments, the depth is 0.2 mm to 5.0 mm. In some embodiments, the depth is 0.3 mm to 5.0 mm. In some embodiments, the depth is 0.4 mm to 5.0 mm. In some embodiments, the depth is 0.5 mm to 5.0 mm. In some embodiments, the depth is 0.6 mm to 5.0 mm. In some embodiments, the depth is 0.7 mm to 5.0 mm. In some embodiments, the depth is 0.8 mm to 5.0 mm. In some embodiments, the depth is 0.9 mm to 5.0 mm. In some embodiments, the depth is 1.0 mm to 5.0 mm. In some embodiments, the depth is 1.1 mm to 5.0 mm. In some embodiments, the depth is 1.2 mm to 5.0 mm. In some embodiments, the depth is 1.3 mm to 5.0 mm. In some embodiments, the depth is 1.4 mm to 5.0 mm. In some embodiments, the depth is 1.5 mm to 5.0 mm. In some embodiments, the depth is 1.6 mm to 5.0 mm. In some embodiments, the depth is 1.7 mm to 5.0 mm. In some embodiments, the depth is 1.8 mm to 5.0 mm. In some embodiments, the depth is 1.9 mm to 5.0 mm. In some embodiments, the depth is 2.0 mm to 5.0 mm. In some embodiments, the depth is 3.0 mm to 5.0 mm. In some embodiments, the depth is 4.0 mm to 5.0 mm.

In some embodiments, the depth is 0.01 mm to 4.0 mm. In some embodiments, the depth is 0.05 mm to 4.0 mm. In some embodiments, the depth is 0.1 mm to 4.0 mm. In some embodiments, the depth is 0.2 mm to 4.0 mm. In some embodiments, the depth is 0.3 mm to 4.0 mm. In some embodiments, the depth is 0.4 mm to 4.0 mm. In some embodiments, the depth is 0.5 mm to 4.0 mm. In some embodiments, the depth is 0.6 mm to 4.0 mm. In some embodiments, the depth is 0.7 mm to 4.0 mm. In some embodiments, the depth is 0.8 mm to 4.0 mm. In some embodiments, the depth is 0.9 mm to 4.0 mm. In some embodiments, the depth is 1.0 mm to 4.0 mm. In some embodiments, the depth is 1.1 mm to 4.0 mm. In some embodiments, the depth is 1.2 mm to 4.0 mm. In some embodiments, the depth is 1.3 mm to 4.0 mm. In some embodiments, the depth is 1.4 mm to 4.0 mm. In some embodiments, the depth is 1.5 mm to 4.0 mm. In some embodiments, the depth is 1.6 mm to 4.0 mm. In some embodiments, the depth is 1.7 mm to 4.0 mm. In some embodiments, the depth is 1.8 mm to 4.0 mm. In some embodiments, the depth is 1.9 mm to 4.0 mm. In some embodiments, the depth is 2.0 mm to 4.0 mm. In some embodiments, the depth is 3.0 mm to 4.0 mm.

In some embodiments, the depth is 0.01 mm to 3.0 mm. In some embodiments, the depth is 0.05 mm to 3.0 mm. In some embodiments, the depth is 0.1 mm to 3.0 mm. In some embodiments, the depth is 0.2 mm to 3.0 mm. In some embodiments, the depth is 0.3 mm to 3.0 mm. In some embodiments, the depth is 0.4 mm to 3.0 mm. In some embodiments, the depth is 0.5 mm to 3.0 mm. In some embodiments, the depth is 0.6 mm to 3.0 mm. In some embodiments, the depth is 0.7 mm to 3.0 mm. In some embodiments, the depth is 0.8 mm to 3.0 mm. In some embodiments, the depth is 0.9 mm to 3.0 mm. In some embodiments, the depth is 1.0 mm to 3.0 mm. In some embodiments, the depth is 1.1 mm to 3.0 mm. In some embodiments, the depth is 1.2 mm to 3.0 mm. In some embodiments, the depth is 1.3 mm to 3.0 mm. In some embodiments, the depth is 1.4 mm to 3.0 mm. In some embodiments, the depth is 1.5 mm to 3.0 mm. In some embodiments, the depth is 1.6 mm to 3.0 mm. In some embodiments, the depth is 1.7 mm to 3.0 mm. In some embodiments, the depth is 1.8 mm to 3.0 mm. In some embodiments, the depth is 1.9 mm to 3.0 mm. In some embodiments, the depth is 2.0 mm to 3.0 mm.

In some embodiments, the depth is 0.01 mm to 2.0 mm. In some embodiments, the depth is 0.05 mm to 2.0 mm. In some embodiments, the depth is 0.1 mm to 2.0 mm. In some embodiments, the depth is 0.2 mm to 2.0 mm. In some embodiments, the depth is 0.3 mm to 2.0 mm. In some embodiments, the depth is 0.4 mm to 2.0 mm. In some embodiments, the depth is 0.5 mm to 2.0 mm. In some embodiments, the depth is 0.6 mm to 2.0 mm. In some embodiments, the depth is 0.7 mm to 2.0 mm. In some embodiments, the depth is 0.8 mm to 2.0 mm. In some embodiments, the depth is 0.9 mm to 2.0 mm. In some embodiments, the depth is 1.0 mm to 2.0 mm. In some embodiments, the depth is 1.1 mm to 2.0 mm. In some embodiments, the depth is 1.2 mm to 2.0 mm. In some embodiments, the depth is 1.3 mm to 2.0 mm. In some embodiments, the depth is 1.4 mm to 2.0 mm. In some embodiments, the depth is 1.5 mm to 2.0 mm. In some embodiments, the depth is 1.6 mm to 2.0 mm. In some embodiments, the depth is 1.7 mm to 2.0 mm. In some embodiments, the depth is 1.8 mm to 2.0 mm. In some embodiments, the depth is 1.9 mm to 2.0 mm.

In some embodiments, the depth is 0.01 mm to 1.5 mm. In some embodiments, the depth is 0.05 mm to 1.5 mm. In some embodiments, the depth is 0.1 mm to 1.5 mm. In some embodiments, the depth is 0.2 mm to 1.5 mm. In some embodiments, the depth is 0.3 mm to 1.5 mm. In some embodiments, the depth is 0.4 mm to 1.5 mm. In some embodiments, the depth is 0.5 mm to 1.5 mm. In some embodiments, the depth is 0.6 mm to 1.5 mm. In some embodiments, the depth is 0.7 mm to 1.5 mm. In some embodiments, the depth is 0.8 mm to 1.5 mm. In some embodiments, the depth is 0.9 mm to 1.5 mm. In some embodiments, the depth is 1.0 mm to 1.5 mm. In some embodiments, the depth is 1.1 mm to 1.5 mm. In some embodiments, the depth is 1.2 mm to 1.5 mm. In some embodiments, the depth is 1.3 mm to 1.5 mm. In some embodiments, the depth is 1.4 mm to 1.5 mm.

In some embodiments, the depth is 0.01 mm to 1.0 mm. In some embodiments, the depth is 0.05 mm to 1.0 mm. In some embodiments, the depth is 0.1 mm to 1.0 mm. In some embodiments, the depth is 0.2 mm to 1.0 mm. In some embodiments, the depth is 0.3 mm to 1.0 mm. In some embodiments, the depth is 0.4 mm to 1.0 mm. In some embodiments, the depth is 0.5 mm to 1.0 mm. In some embodiments, the depth is 0.6 mm to 1.0 mm. In some embodiments, the depth is 0.7 mm to 1.0 mm. In some embodiments, the depth is 0.8 mm to 1.0 mm. In some embodiments, the depth is 0.9 mm to 1.0 mm.

In some embodiments, the depth is 0.01 mm to 0.5 mm. In some embodiments, the depth is 0.05 mm to 0.5 mm. In some embodiments, the depth is 0.1 mm to 0.5 mm. In some embodiments, the depth is 0.2 mm to 0.5 mm. In some embodiments, the depth is 0.3 mm to 0.5 mm. In some embodiments, the depth is 0.4 mm to 0.5 mm.

In some embodiments, the depth is 1% of a thickness of the layer or layers in which the groove is made (e.g., a backsheet). In some embodiments, the depth is 5% of the thickness. In some embodiments, the depth is 10% of the thickness. In some embodiments, the depth is 20% of the thickness. In some embodiments, the depth is 30% of the thickness. In some embodiments, the depth is 40% of the thickness. In some embodiments, the depth is 50% of the thickness. In some embodiments, the depth is 60% of the thickness. In some embodiments, the depth is 70% of the thickness. In some embodiments, the depth is 80% of the thickness. In some embodiments, the depth is 90% of the thickness. In some embodiments, the depth is 95% of the thickness. In some embodiments, the depth is 96% of the thickness. In some embodiments, the depth is 97% of the thickness. In some embodiments, the depth is 98% of the thickness. In some embodiments, the depth is 99% of the thickness.

In some embodiments, the depth is more than 1% of the thickness of the layer or layers in which the groove is made (e.g., a backsheet). In some embodiments, the depth is more than 5% of the thickness. In some embodiments, the depth is more than 10% of the thickness. In some embodiments, the depth is more than 20% of the thickness. In some embodiments, the depth is more than 30% of the thickness. In some embodiments, the depth is more than 40% of the thickness. In some embodiments, the depth is more than 50% of the thickness. In some embodiments, the depth is more than 60% of the thickness. In some embodiments, the depth is more than 70% of the thickness. In some embodiments, the depth is more than 80% of the thickness. In some embodiments, the depth is more than 90% of the thickness. In some embodiments, the depth is more than 95% of the thickness. In some embodiments, the depth is more than 96% of the thickness. In some embodiments, the depth is more than 97% of the thickness. In some embodiments, the depth is more than 98% of the thickness. In some embodiments, the depth is more than 99% of the thickness.

In some embodiments, the depth is less than 1% of the thickness of the layer or layers in which the groove is made (e.g., a backsheet). In some embodiments, the depth is less than 5% of the thickness. In some embodiments, the depth is less than 10% of the thickness. In some embodiments, the depth is less than 20% of the thickness. In some embodiments, the depth is less than 30% of the thickness. In some embodiments, the depth is less than 40% of the thickness. In some embodiments, the depth is less than 50% of the thickness. In some embodiments, the depth is less than 60% of the thickness. In some embodiments, the depth is less than 70% of the thickness. In some embodiments, the depth is less than 80% of the thickness. In some embodiments, the depth is less than 90% of the thickness. In some embodiments, the depth is less than 95% of the thickness. In some embodiments, the depth is less than 96% of the thickness. In some embodiments, the depth is less than 97% of the thickness. In some embodiments, the depth is less than 98% of the thickness. In some embodiments, the depth is less than 99% of the thickness.

In some embodiments, the depth is 1% to 99% of the thickness of the layer or layers in which the groove is made (e.g., a backsheet). In some embodiments, the depth is 5% to 99% of the thickness. In some embodiments, the depth is 10% to 99% of the thickness. In some embodiments, the depth is 20% to 99% of the thickness. In some embodiments, the depth is 30% to 99% of the thickness. In some embodiments, the depth is 40% to 99% of the thickness. In some embodiments, the depth is 50% to 99% of the thickness. In some embodiments, the depth is 60% to 99% of the thickness. In some embodiments, the depth is 70% to 99% of the thickness. In some embodiments, the depth is 80% to 99% of the thickness. In some embodiments, the depth is 90% to 99% of the thickness. In some embodiments, the depth is 95% to 99% of the thickness.

In some embodiments, the depth is 1% to 95% of the thickness of the layer or layers in which the groove is made (e.g., a backsheet). In some embodiments, the depth is 5% to 95% of the thickness. In some embodiments, the depth is 10% to 95% of the thickness. In some embodiments, the depth is 20% to 95% of the thickness. In some embodiments, the depth is 30% to 95% of the thickness. In some embodiments, the depth is 40% to 95% of the thickness. In some embodiments, the depth is 50% to 95% of the thickness. In some embodiments, the depth is 60% to 95% of the thickness. In some embodiments, the depth is 70% to 95% of the thickness. In some embodiments, the depth is 80% to 95% of the thickness. In some embodiments, the depth is 90% to 95% of the thickness.

In some embodiments, the depth is 1% to 90% of the thickness of the layer or layers in which the groove is made (e.g., a backsheet). In some embodiments, the depth is 5% to 90% of the thickness. In some embodiments, the depth is 10% to 90% of the thickness. In some embodiments, the depth is 20% to 90% of the thickness. In some embodiments, the depth is 30% to 90% of the thickness. In some embodiments, the depth is 40% to 90% of the thickness. In some embodiments, the depth is 50% to 90% of the thickness. In some embodiments, the depth is 60% to 90% of the thickness. In some embodiments, the depth is 70% to 90% of the thickness. In some embodiments, the depth is 80% to 90% of the thickness.

In some embodiments, the depth is 1% to 50% of the thickness of the layer or layers in which the groove is made (e.g., a backsheet). In some embodiments, the depth is 5% to 50% of the thickness. In some embodiments, the depth is 10% to 50% of the thickness. In some embodiments, the depth is 20% to 50% of the thickness. In some embodiments, the depth is 30% to 50% of the thickness. In some embodiments, the depth is 40% to 50% of the thickness.

In some embodiments, the depth is 1% to 10% of the thickness of the layer or layers in which the groove is made (e.g., a backsheet). In some embodiments, the depth is 5% to 10% of the thickness. In some embodiments, the depth is 1% to 5% of the thickness.

In some embodiments, a width of the nail zone between the first longitudinal groove and the second longitudinal groove is 0.5 inch. In some embodiments, the width is 0.6 inch. In some embodiments, the width is 0.7 inch. In some embodiments, the width is 0.8 inch. In some embodiments, the width is 0.9 inch. In some embodiments, the width is 1.0 inch. In some embodiments, the width is 1.1 inches. In some embodiments, the width is 1.2 inches. In some embodiments, the width is 1.3 inches. In some embodiments, the width is 1.4 inches. In some embodiments, the width is 1.5 inches. In some embodiments, the width is 1.6 inches. In some embodiments, the width is 1.7 inches. In some embodiments, the width is 1.8 inches. In some embodiments, the width is 1.9 inches. In some embodiments, the width is 2.0 inches.

In some embodiments, the width is more than 0.5 inch. In some embodiments, the width is more than 0.6 inch. In some embodiments, the width is more than 0.7 inch. In some embodiments, the width is more than 0.8 inch. In some embodiments, the width is more than 0.9 inch. In some embodiments, the width is more than 1.0 inch. In some embodiments, the width is more than 1.1 inches. In some embodiments, the width is more than 1.2 inches. In some embodiments, the width is more than 1.3 inches. In some embodiments, the width is more than 1.4 inches. In some embodiments, the width is more than 1.5 inches. In some embodiments, the width is more than 1.6 inches. In some embodiments, the width is more than 1.7 inches. In some embodiments, the width is more than 1.8 inches. In some embodiments, the width is more than 1.9 inches. In some embodiments, the width is more than 2.0 inches.

In some embodiments, the width is less than 0.5 inch. In some embodiments, the width is less than 0.6 inch. In some embodiments, the width is less than 0.7 inch. In some embodiments, the width is less than 0.8 inch. In some embodiments, the width is less than 0.9 inch. In some embodiments, the width is less than 1.0 inch. In some embodiments, the width is less than 1.1 inches. In some embodiments, the width is less than 1.2 inches. In some embodiments, the width is less than 1.3 inches. In some embodiments, the width is less than 1.4 inches. In some embodiments, the width is less than 1.5 inches. In some embodiments, the width is less than 1.6 inches. In some embodiments, the width is less than 1.7 inches. In some embodiments, the width is less than 1.8 inches. In some embodiments, the width is less than 1.9 inches. In some embodiments, the width is less than 2.0 inches.

In some embodiments, the width is 0.5 inch to 2.0 inches. In some embodiments, the width is 0.6 inch to 2.0 inches. In some embodiments, the width is 0.7 inch to 2.0 inches. In some embodiments, the width is 0.8 inch to 2.0 inches. In some embodiments, the width is 0.9 inch to 2.0 inches. In some embodiments, the width is 1.0 inch to 2.0 inches. In some embodiments, the width is 1.1 inches to 2.0 inches. In some embodiments, the width is 1.2 inches to 2.0 inches. In some embodiments, the width is 1.3 inches to 2.0 inches. In some embodiments, the width is 1.4 inches to 2.0 inches. In some embodiments, the width is 1.5 inches to 2.0 inches. In some embodiments, the width is 1.6 inches to 2.0 inches. In some embodiments, the width is 1.7 inches to 2.0 inches. In some embodiments, the width is 1.8 inches to 2.0 inches. In some embodiments, the width is 1.9 inches to 2.0 inches.

In some embodiments, the width is 0.5 inch to 1.9 inches. In some embodiments, the width is 0.6 inch to 1.9 inches. In some embodiments, the width is 0.7 inch to 1.9 inches. In some embodiments, the width is 0.8 inch to 1.9 inches. In some embodiments, the width is 0.9 inch to 1.9 inches. In some embodiments, the width is 1.0 inch to 1.9 inches. In some embodiments, the width is 1.1 inches to 1.9 inches. In some embodiments, the width is 1.2 inches to 1.9 inches. In some embodiments, the width is 1.3 inches to 1.9 inches. In some embodiments, the width is 1.4 inches to 1.9 inches. In some embodiments, the width is 1.5 inches to 1.9 inches. In some embodiments, the width is 1.6 inches to 1.9 inches. In some embodiments, the width is 1.7 inches to 1.9 inches. In some embodiments, the width is 1.8 inches to 1.9 inches.

In some embodiments, the width is 0.5 inch to 1.8 inches. In some embodiments, the width is 0.6 inch to 1.8 inches. In some embodiments, the width is 0.7 inch to 1.8 inches. In some embodiments, the width is 0.8 inch to 1.8 inches. In some embodiments, the width is 0.9 inch to 1.8 inches. In some embodiments, the width is 1.0 inch to 1.8 inches. In some embodiments, the width is 1.1 inches to 1.8 inches. In some embodiments, the width is 1.2 inches to 1.8 inches. In some embodiments, the width is 1.3 inches to 1.8 inches. In some embodiments, the width is 1.4 inches to 1.8 inches. In some embodiments, the width is 1.5 inches to 1.8 inches. In some embodiments, the width is 1.6 inches to 1.8 inches. In some embodiments, the width is 1.7 inches to 1.8 inches.

In some embodiments, the width is 0.5 inch to 1.7 inches. In some embodiments, the width is 0.6 inch to 1.7 inches. In some embodiments, the width is 0.7 inch to 1.7 inches. In some embodiments, the width is 0.8 inch to 1.7 inches. In some embodiments, the width is 0.9 inch to 1.7 inches. In some embodiments, the width is 1.0 inch to 1.7 inches. In some embodiments, the width is 1.1 inches to 1.7 inches. In some embodiments, the width is 1.2 inches to 1.7 inches. In some embodiments, the width is 1.3 inches to 1.7 inches. In some embodiments, the width is 1.4 inches to 1.7 inches. In some embodiments, the width is 1.5 inches to 1.7 inches. In some embodiments, the width is 1.6 inches to 1.7 inches.

In some embodiments, the width is 0.5 inch to 1.6 inches. In some embodiments, the width is 0.6 inch to 1.6 inches. In some embodiments, the width is 0.7 inch to 1.6 inches. In some embodiments, the width is 0.8 inch to 1.6 inches. In some embodiments, the width is 0.9 inch to 1.6 inches. In some embodiments, the width is 1.0 inch to 1.6 inches. In some embodiments, the width is 1.1 inches to 1.6 inches. In some embodiments, the width is 1.2 inches to 1.6 inches. In some embodiments, the width is 1.3 inches to 1.6 inches. In some embodiments, the width is 1.4 inches to 1.6 inches. In some embodiments, the width is 1.5 inches to 1.6 inches.

In some embodiments, the width is 0.5 inch to 1.5 inches. In some embodiments, the width is 0.6 inch to 1.5 inches. In some embodiments, the width is 0.7 inch to 1.5 inches. In some embodiments, the width is 0.8 inch to 1.5 inches. In some embodiments, the width is 0.9 inch to 1.5 inches. In some embodiments, the width is 1.0 inch to 1.5 inches. In some embodiments, the width is 1.1 inches to 1.5 inches. In some embodiments, the width is 1.2 inches to 1.5 inches. In some embodiments, the width is 1.3 inches to 1.5 inches. In some embodiments, the width is 1.4 inches to 1.5 inches.

In some embodiments, the width is 0.5 inch to 1.4 inches. In some embodiments, the width is 0.6 inch to 1.4 inches. In some embodiments, the width is 0.7 inch to 1.4 inches. In some embodiments, the width is 0.8 inch to 1.4 inches. In some embodiments, the width is 0.9 inch to 1.4 inches. In some embodiments, the width is 1.0 inch to 1.4 inches. In some embodiments, the width is 1.1 inches to 1.4 inches. In some embodiments, the width is 1.2 inches to 1.4 inches. In some embodiments, the width is 1.3 inches to 1.4 inches.

In some embodiments, the width is 0.5 inch to 1.3 inches. In some embodiments, the width is 0.6 inch to 1.3 inches. In some embodiments, the width is 0.7 inch to 1.3 inches. In some embodiments, the width is 0.8 inch to 1.3 inches. In some embodiments, the width is 0.9 inch to 1.3 inches. In some embodiments, the width is 1.0 inch to 1.3 inches. In some embodiments, the width is 1.1 inches to 1.3 inches. In some embodiments, the width is 1.2 inches to 1.3 inches.

In some embodiments, the width is 0.5 inch to 1.2 inches. In some embodiments, the width is 0.6 inch to 1.2 inches. In some embodiments, the width is 0.7 inch to 1.2 inches. In some embodiments, the width is 0.8 inch to 1.2 inches. In some embodiments, the width is 0.9 inch to 1.2 inches. In some embodiments, the width is 1.0 inch to 1.2 inches. In some embodiments, the width is 1.1 inches to 1.2 inches.

In some embodiments, the width is 0.5 inch to 1.1 inches. In some embodiments, the width is 0.6 inch to 1.1 inches. In some embodiments, the width is 0.7 inch to 1.1 inches. In some embodiments, the width is 0.8 inch to 1.1 inches. In some embodiments, the width is 0.9 inch to 1.1 inches. In some embodiments, the width is 1.0 inch to 1.1 inches.

In some embodiments, the width is 0.5 inch to 1.0 inch. In some embodiments, the width is 0.6 inch to 1.0 inch. In some embodiments, the width is 0.7 inch to 1.0 inch. In some embodiments, the width is 0.8 inch to 1.0 inch. In some embodiments, the width is 0.7 inch to 1.0 inch. In some embodiments, the width is 0.9 inch to 1.0 inch.

In some embodiments, the width is 0.5 inch to 0.9 inch. In some embodiments, the width is 0.6 inch to 0.9 inch. In some embodiments, the width is 0.7 inch to 0.9 inch. In some embodiments, the width is 0.8 inch to 0.9 inch.

In some embodiments, the width is 0.5 inch to 0.8 inch. In some embodiments, the width is 0.6 inch to 0.8 inch. In some embodiments, the width is 0.7 inch to 0.8 inch.

In some embodiments, the width is 0.5 inch to 0.7 inch. In some embodiments, the width is 0.6 inch to 0.7 inch. In some embodiments, the width is 0.5 inch to 0.6 inch.

In some embodiments, the width is 10 mm. In some embodiments, the width is 20 mm. In some embodiments, the width is 30 mm. In some embodiments, the width is 40 mm. In some embodiments, the width is 50 mm. In some embodiments, the width is 60 mm. In some embodiments, the width is 70 mm. In some embodiments, the width is 100 mm. In some embodiments, the width is 200 mm. In some embodiments, the width is 300 mm. In some embodiments, the width is 400 mm. In some embodiments, the width is 500 mm. In some embodiments, the width is 600 mm. In some embodiments, the width is 700 mm.

In some embodiments, the width is more than 10 mm. In some embodiments, the width is more than 20 mm. In some embodiments, the width is more than 30 mm. In some embodiments, the width is more than 40 mm. In some embodiments, the width is more than 50 mm. In some embodiments, the width is more than 60 mm. In some embodiments, the width is more than 70 mm. In some embodiments, the width is more than 100 mm. In some embodiments, the width is more than 200 mm. In some embodiments, the width is more than 300 mm. In some embodiments, the width is more than 400 mm. In some embodiments, the width is more than 500 mm. In some embodiments, the width is more than 600 mm. In some embodiments, the width is more than 700 mm.

In some embodiments, the width is less than 10 mm. In some embodiments, the width is less than 20 mm. In some embodiments, the width is less than 30 mm. In some embodiments, the width is less than 40 mm. In some embodiments, the width is less than 50 mm. In some embodiments, the width is less than 60 mm. In some embodiments, the width is less than 70 mm. In some embodiments, the width is less than 100 mm. In some embodiments, the width is less than 200 mm. In some embodiments, the width is less than 300 mm. In some embodiments, the width is less than 400 mm. In some embodiments, the width is less than 500 mm. In some embodiments, the width is less than 600 mm. In some embodiments, the width is less than 700 mm.

In some embodiments, the width of the nail zone is 10 mm to 70 mm. In some embodiments, the width of the nail zone is 10 mm to 60 mm. In some embodiments, the width of the nail zone is 10 mm to 50 mm. In some embodiments, the width of the nail zone is 10 mm to 40 mm. In some embodiments, the width of the nail zone is 10 mm to 30 mm. In some embodiments, the width of the nail zone is 10 mm to 20 mm. In some embodiments, the width of the nail zone is 10 mm to 100 mm. In some embodiments, the width of the nail zone is 10 mm to 50 mm.

In some embodiments, the width of the nail zone is 20 mm to 70 mm. In some embodiments, the width of the nail zone is 20 mm to 60 mm. In some embodiments, the width of the nail zone is 20 mm to 50 mm. In some embodiments, the width of the nail zone is 20 mm to 40 mm. In some embodiments, the width of the nail zone is 20 mm to 30 mm. In some embodiments, the width of the nail zone is 20 mm to 100 mm. In some embodiments, the width of the nail zone is 20 mm to 50 mm.

In some embodiments, the width of the nail zone is 30 mm to 70 mm. In some embodiments, the width of the nail zone is 30 mm to 60 mm. In some embodiments, the width of the nail zone is 30 mm to 50 mm. In some embodiments, the width of the nail zone is 30 mm to 40 mm.

In some embodiments, the width of the nail zone is 40 mm to 70 mm. In some embodiments, the width of the nail zone is 40 mm to 60 mm. In some embodiments, the width of the nail zone is 40 mm to 50 mm.

In some embodiments, the width of the nail zone is 50 mm to 70 mm. In some embodiments, the width of the nail zone is 50 mm to 60 mm. In some embodiments, the width of the nail zone is 60 mm to 70 mm.

In some embodiments, the width of the nail zone is 50 mm to 700 mm. In some embodiments, the width of the nail zone is 50 mm to 600 mm. In some embodiments, the width of the nail zone is 50 mm to 500 mm. In some embodiments, the width of the nail zone is 50 mm to 400 mm. In some embodiments, the width of the nail zone is 50 mm to 300 mm. In some embodiments, the width of the nail zone is 50 mm to 200 mm. In some embodiments, the width of the nail zone is 50 mm to 100 mm.

In some embodiments, the width of the nail zone is 100 mm to 700 mm. In some embodiments, the width of the nail zone is 100 mm to 600 mm. In some embodiments, the width of the nail zone is 100 mm to 500 mm. In some embodiments, the width of the nail zone is 100 mm to 400 mm. In some embodiments, the width of the nail zone is 100 mm to 300 mm. In some embodiments, the width of the nail zone is 100 mm to 200 mm.

In some embodiments, the width of the nail zone is 200 mm to 700 mm. In some embodiments, the width of the nail zone is 200 mm to 600 mm. In some embodiments, the width of the nail zone is 200 mm to 500 mm. In some embodiments, the width of the nail zone is 200 mm to 400 mm. In some embodiments, the width of the nail zone is 200 mm to 300 mm.

In some embodiments, the width of the nail zone is 300 mm to 700 mm. In some embodiments, the width of the nail zone is 300 mm to 600 mm. In some embodiments, the width of the nail zone is 300 mm to 500 mm. In some embodiments, the width of the nail zone is 300 mm to 400 mm. In some embodiments, the width of the nail zone is 400 mm to 500 mm.

In some embodiments, both of the grooves extend from one end of the roofing module to the other end of the roofing module, along a major dimension of the roofing module. In some embodiments, only one of the grooves extends from one end of the roofing module to the other end of the roofing module. In some embodiments, neither of the grooves extends from one end of the roofing module to the other end of the roofing module.

In some embodiments, both of the grooves extend from one end of the roofing module to a location spaced apart the other end of the roofing module, such that neither of the grooves extends from one end to the other end. In some embodiments, only one of the grooves extends from one end of the roofing module to a location spaced apart from the other end of the roofing module, such that only one of the grooves extends from one end to the other end.

In some embodiments, the photovoltaic module further comprises an encapsulant encapsulating the at least one solar cell. In some embodiments, the encapsulant encapsulates one side of the at least one solar cell. In some embodiments, the encapsulant encapsulates at least one side of the at least one solar cell. In some embodiments, the encapsulant fully encapsulates the at least one solar cell. In some embodiments, the encapsulant contacts the backsheet.

In some embodiments, the photovoltaic module further comprises a frontsheet. In some embodiments, the frontsheet contacts the encapsulant. In some embodiments, the frontsheet is an uppermost layer of the photovoltaic module when the photovoltaic module is installed on or above a roof deck in a roofing system.

In some embodiments, the frontsheet is a single layer. In some embodiments, the frontsheet is multiple layers.

In some embodiments, there is an adhesive between the frontsheet and the encapsulant.

In some embodiments, a roofing system includes a roof deck, and at least one roofing module installed on or above the roof deck. In some embodiments, the roof deck is a steep slope roof deck. In some embodiments, the roof deck is a sloped roof deck. In some embodiments, the roof deck is a flat roof deck.

In some embodiments, the at least one roofing module comprises one roofing module. In some embodiments, the at least one roofing module comprises two roofing modules. In some embodiments, the at least one roofing module comprises three roofing modules. In some embodiments, the at least one roofing module comprises four roofing modules. In some embodiments, the at least one roofing module comprises five roofing modules. In some embodiments, the at least one roofing module comprises more than five roofing modules. In some embodiments, at least one of the roofing modules is a photovoltaic module. In some embodiments, at least one of the roofing modules is a non-photovoltaic module. In some embodiments, at least one of the roofing modules is a photovoltaic module, and at least one of the roofing modules is a non-photovoltaic module.

In some embodiments, when the roofing modules are installed on or above the roof deck in the roofing system, at least some of the roofing modules are installed next to one another in a same row on the roof deck. In some embodiments, when the roofing modules are installed on or above the roof deck, at least some of the roofing modules are installed in multiple, different rows, where one row is above the other row on the roof deck. In some embodiments, when the roofing modules are installed on or above the roof deck in multiple rows, at least some of the roofing modules in one row overlap at least some of the roofing modules in another row. In some embodiments, when the roofing modules are installed on or above the roof deck in multiple rows, at least some of the roofing modules in one row overlap headlap portions of at least some of the roofing modules in another row (e.g., such that a part of one roofing module covers at least a part of the headlap portion of another roofing module).

In some embodiments, one or more fasteners are installed through the nail zone of one or more of the roofing modules, thereby to fasten the roofing module to the roof deck. In some embodiments, the one or more fasteners penetrate the nail zone. In some embodiments, the one or more fasteners penetrate the roof deck. In some embodiments, the one or more fasteners penetrate an underlayment between the roof deck and the roofing module (e.g., when the roofing module is installed above the roof deck). In some embodiments, an underlayment is not installed or otherwise disposed between the roof deck and the roofing module.

In some embodiments, the present invention provides a method. In some embodiments, the method comprises obtaining a backsheet material. In some embodiments, the method comprises forming the first groove in the headlap portion of the backsheet material (e.g., in a portion of the backsheet material that will be the headlap when the backsheet material is used to form a photovoltaic module). In some embodiments, the method comprises forming the second groove in the headlap portion of the backsheet material. In some embodiments, the grooves are formed simultaneously (e.g., the forming of the first groove occurs at a same time as the forming of the second groove). In some embodiments, one groove is formed prior to the other groove.

In some embodiments, either or both of the grooves are formed in the backsheet material to which no other layers are added. In some embodiments, either or both of the grooves are formed in the backsheet material to which one or more other layers are laminated before formation of the backsheet.

In some embodiments, at least one groove is formed by a tool. In some embodiments, the tool is an awl. In some embodiments, the tool is a bit. In some embodiments, the tool is a blade. In some embodiments, the tool is a cutter. In some embodiments, the tool is knife. In some embodiments, the tool is a blade. In some embodiments, the tool is a razor. In some embodiments, the tool includes a sharp tip. In some embodiments, the tool is disposed in a fixture. In some embodiments, the fixture is disposed within a manufacturing line. In some embodiments, the manufacturing line is a manufacturing line for a backsheet material. In some embodiments, the backsheet material is cut into backsheets. In some embodiments, the backsheet material is cut into one or more backsheets in a same manufacturing line. In some embodiments, the backsheet material is cut into one or more backsheets in a different manufacturing line.

In some embodiments, after forming one or both of the grooves, the grooved backsheet material is cut, thereby to form a grooved backsheet. In some embodiments, the frontsheet, encapsulant and/or the at least one solar cell are laminated with the backsheet, thereby to form the photovoltaic module. In some embodiments, before the backsheet material is cut, one or more layers are laminated to the grooved backsheet material.

With reference to the figures, FIG. 1 shows a schematic view of a roofing module, according to some embodiments of the invention. As shown in the figure, in some embodiments, the roofing module 100 comprises a photovoltaic module. In some embodiments, the roofing module 100 comprises at least one solar cell 200, and a backsheet 300. In some embodiments, the solar cell 200 is positioned on the backsheet 300. In some embodiments, the solar cell 200 is laminated to the backsheet 300. In some embodiments, the roofing module 100 is a non-photovoltaic module. In some embodiments, the roofing module 100 includes a cap layer over a core layer.

As shown in FIG. 1, in some embodiments, the backsheet 300 includes a headlap portion 310. In some embodiments, the headlap portion 310 includes two longitudinal grooves 320 (e.g., a first groove and a second groove) formed thereon. As shown in the figure, in some embodiments, the longitudinal grooves 320 are spaced apart from one another, thereby to define a nail zone 330 between the longitudinal grooves 320. In some embodiments, the nail zone 330 is configured to receive at least one fastener that penetrates the roofing module 100, thereby to secure or fasten the roofing module 100 to a roof deck.

As shown in FIGS. 1 and 2, in some embodiments, the longitudinal grooves 320 extend between a first end 340 of the backsheet 300 and a second end 350 of the backsheet 300, the first end 340 spaced apart from and opposite to the second end 350 along a major dimension of the shingle, such that the longitudinal grooves 320 extend an entire length of the roofing module 100 (e.g., the longitudinal grooves extend an entire distance between the first end 340 and the second end 350). In some embodiments, as shown in FIG. 1, each of the longitudinal grooves 320 is a single, continuous line segment. However, as shown in FIG. 2, either or both of the longitudinal grooves 320 may be two or more line segments (e.g., a discontinuous line).

In some embodiments, as shown in FIGS. 3-14, one or both of the longitudinal grooves 320 do not extend from end 340 to end 350 of the backsheet 300 (e.g., one or both of the longitudinal grooves 320 do not extend an entire length of the roofing module). In some embodiments, either or both of the longitudinal grooves 320 may be two or more lines segments (e.g., a discontinuous line as shown in FIG. 2).

Referring to FIG. 3, in some embodiments, one of the grooves 320 extends from the first end 340 to a location between the first end 340 and the second end 350, while the other of the grooves 320 extends from the first end 340 to the second end 350.

Figure 4:
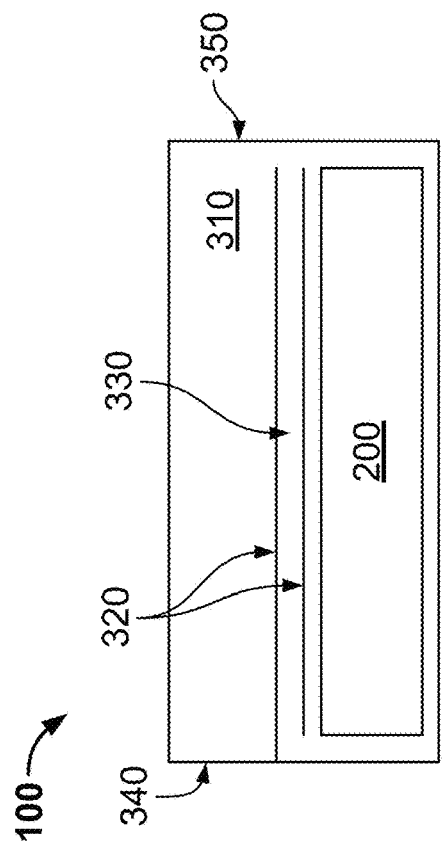
FIG. 4 is a schematic top view of a roofing module, in accordance with some embodiments of the invention.

Referring to FIG. 4, in some embodiments, one of the grooves 320 extends from the first end 340 to a location between the first end 340 and the second end 350, while the other of the grooves 320 extends from the second end 350 to a location between the first end 340 and the second end 350.

Figure 5:
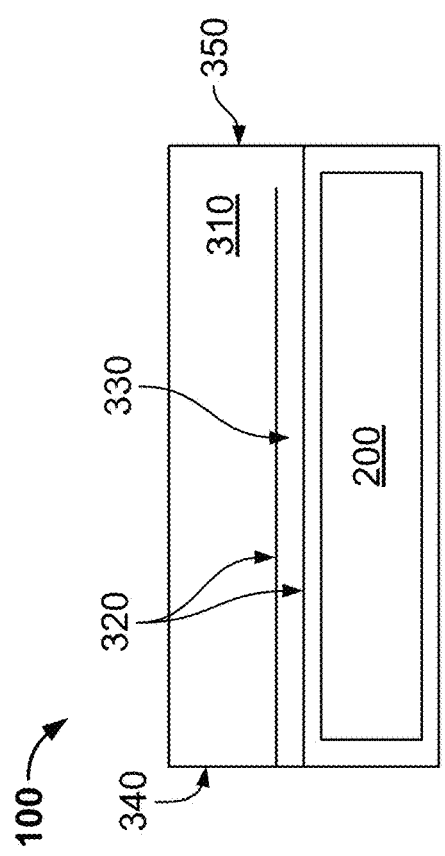
FIG. 5 is a schematic top view of a roofing module, in accordance with some embodiments of the invention.

Referring to FIG. 5, in some embodiments, one of the grooves 320 extends from the first end 340 to a location between the first end 340 and the second end 350, while the other of the grooves 320 extends from the first end 340 to a location between the first end 340 and the second end 350.

Figure 6:
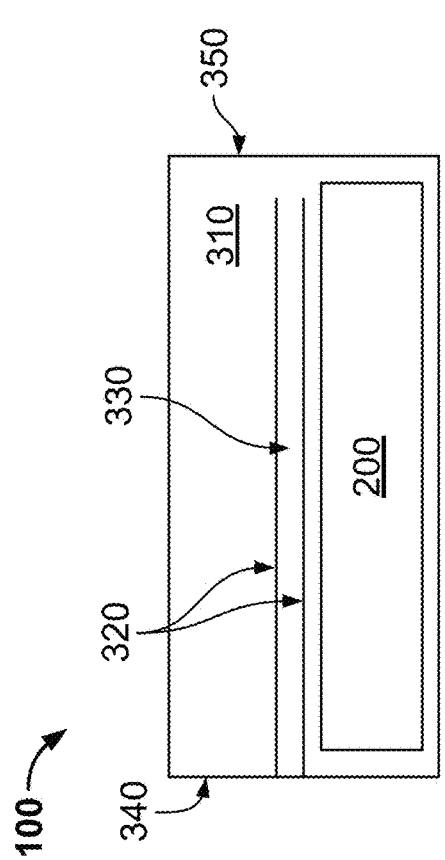
FIG. 6 is a schematic top view of a roofing module, in accordance with some embodiments of the invention.

Referring to FIG. 6, in some embodiments, one of the grooves 320 extends from the first end 340 to a location between the first end 340 and the second end 350, while the other of the grooves 320 extends from a first location between the first end 340 and the second end 350 to a second location between the first end 340 and the second end 350.

Figure 7:
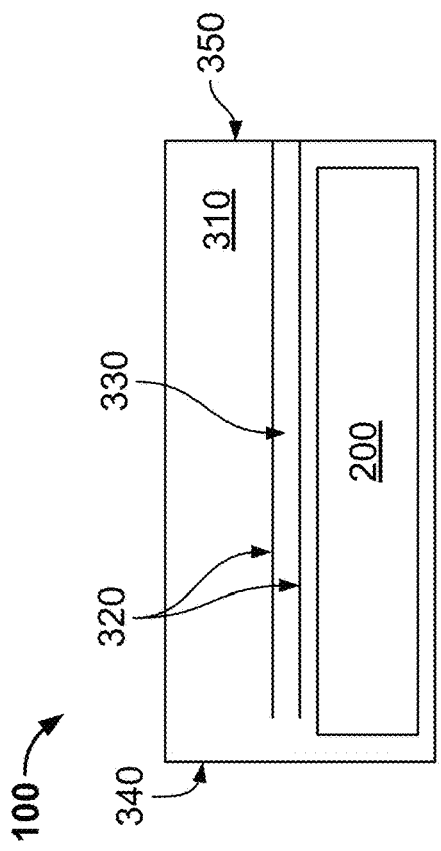
FIG. 7 is a schematic top view of a roofing module, in accordance with some embodiments of the invention.

Referring to FIG. 7, in some embodiments, one of the grooves 320 extends from the second end 350 to a location between the first end 340 and the second end 350, while the other of the grooves 320 extends from the first end 340 to the second end 350.

Figure 8:
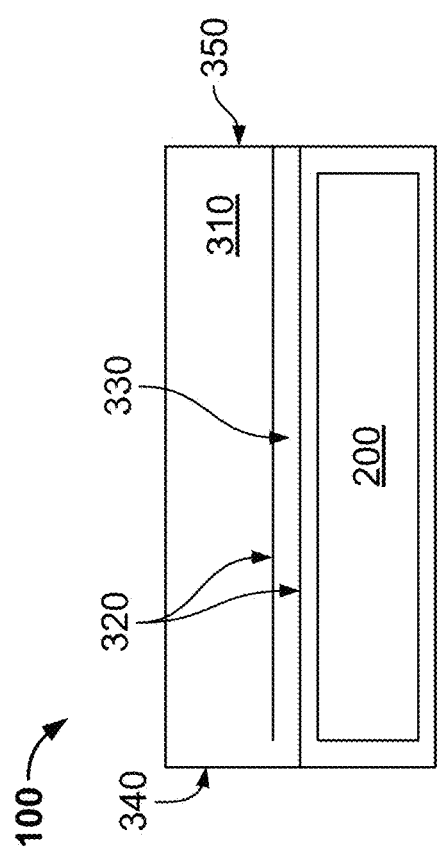
FIG. 8 is a schematic top view of a roofing module, in accordance with some embodiments of the invention.

Referring to FIG. 8, in some embodiments, one of the grooves 320 extends from the second end 350 to a location between the first end 340 and the second end 350, while the other of the grooves 320 extends from the second end 350 to a location between the first end 340 and the second end 350.

Figure 9:
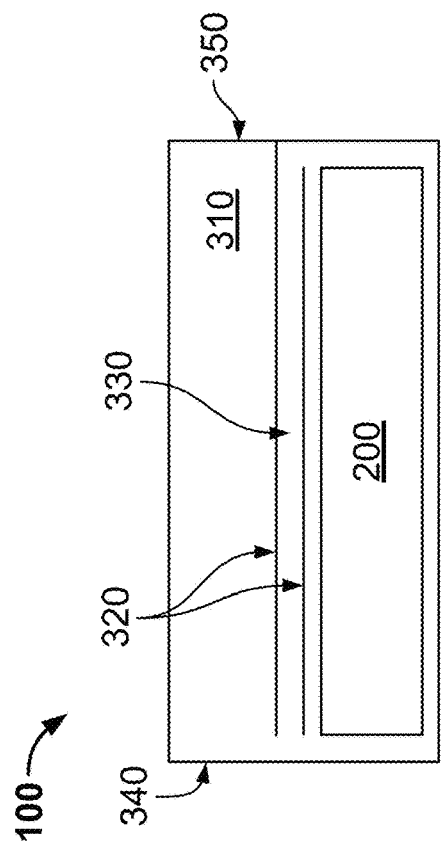
FIG. 9 is a schematic top view of a roofing module, in accordance with some embodiments of the invention.

Referring to FIG. 9, in some embodiments, one of the grooves 320 extends from the second end 350 to a location between the first end 340 and the second end 350, while the other of the grooves 320 extends from the first end 340 to a location between the first end 340 and the second end 350.

Figure 10:
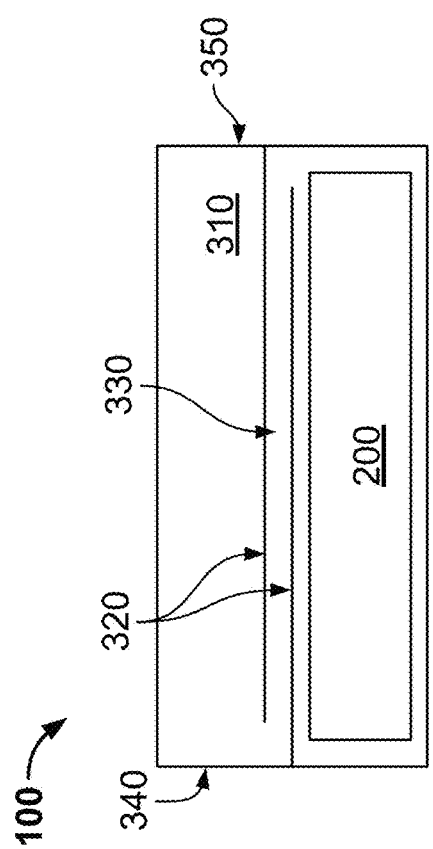
FIG. 10 is a schematic top view of a roofing module, in accordance with some embodiments of the invention.

Referring to FIG. 10, in some embodiments, one of the grooves 320 extends from the second end 350 to a location between the first end 340 and the second end 350, while the other of the grooves 320 extends from a first location between the first end 340 and the second end 350 to a second location between the first end 340 and the second end 350.

Figure 11:
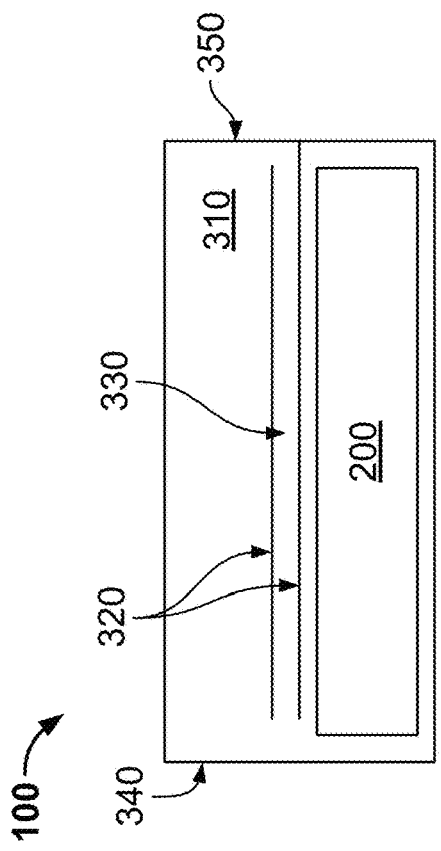
FIG. 11 is a schematic top view of a roofing module, in accordance with some embodiments of the invention.

Referring to FIG. 11, in some embodiments, one of the grooves 320 extends from a first location between the first end 340 and the second end 350 to a second location between the first end 340 and the second end 350, while the other of the grooves 320 extends from the first end 340 to the second end 350.

Figure 12:
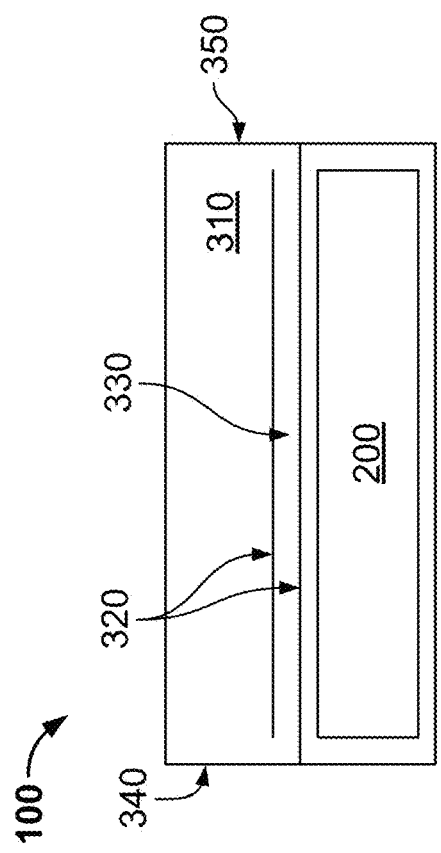
FIG. 12 is a schematic top view of a roofing module, in accordance with some embodiments of the invention.

Referring to FIG. 12, in some embodiments, one of the grooves 320 extends from a first location between the first end 340 and the second end 350 to a second location between the first end 340 and the second end 350, while the other of the grooves 320 extends from the second end 350 to a location between the first end 340 and the second end 350.

Figure 13:
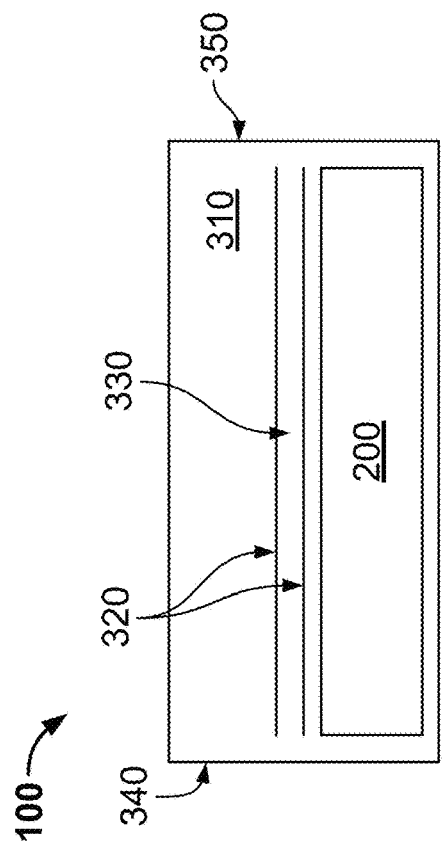
FIG. 13 is a schematic top view of a roofing module, in accordance with some embodiments of the invention.

Referring to FIG. 13, in some embodiments, one of the grooves 320 extends from a first location between the first end 340 and the second end 350 to a second location between the first end 340 and the second end 350, while the other of the grooves 320 extends from the first end 340 to a location between the first end 340 and the second end 350.

Figure 14:
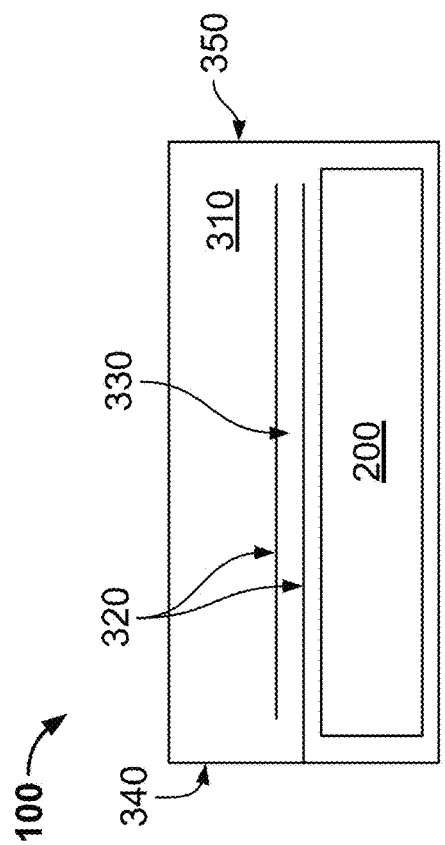
FIG. 14 is a schematic top view of a roofing module, in accordance with some embodiments of the invention.

Referring to FIG. 14, in some embodiments, one of the grooves 320 extends from a first location between the first end 340 and the second end 350 to a second location between the first end 340 and the second end 350, while the other of the grooves 320 extends from a third location between the first end 340 and the second end 350 to a fourth location between the first end 340 and the second end 350.

Figure 15:
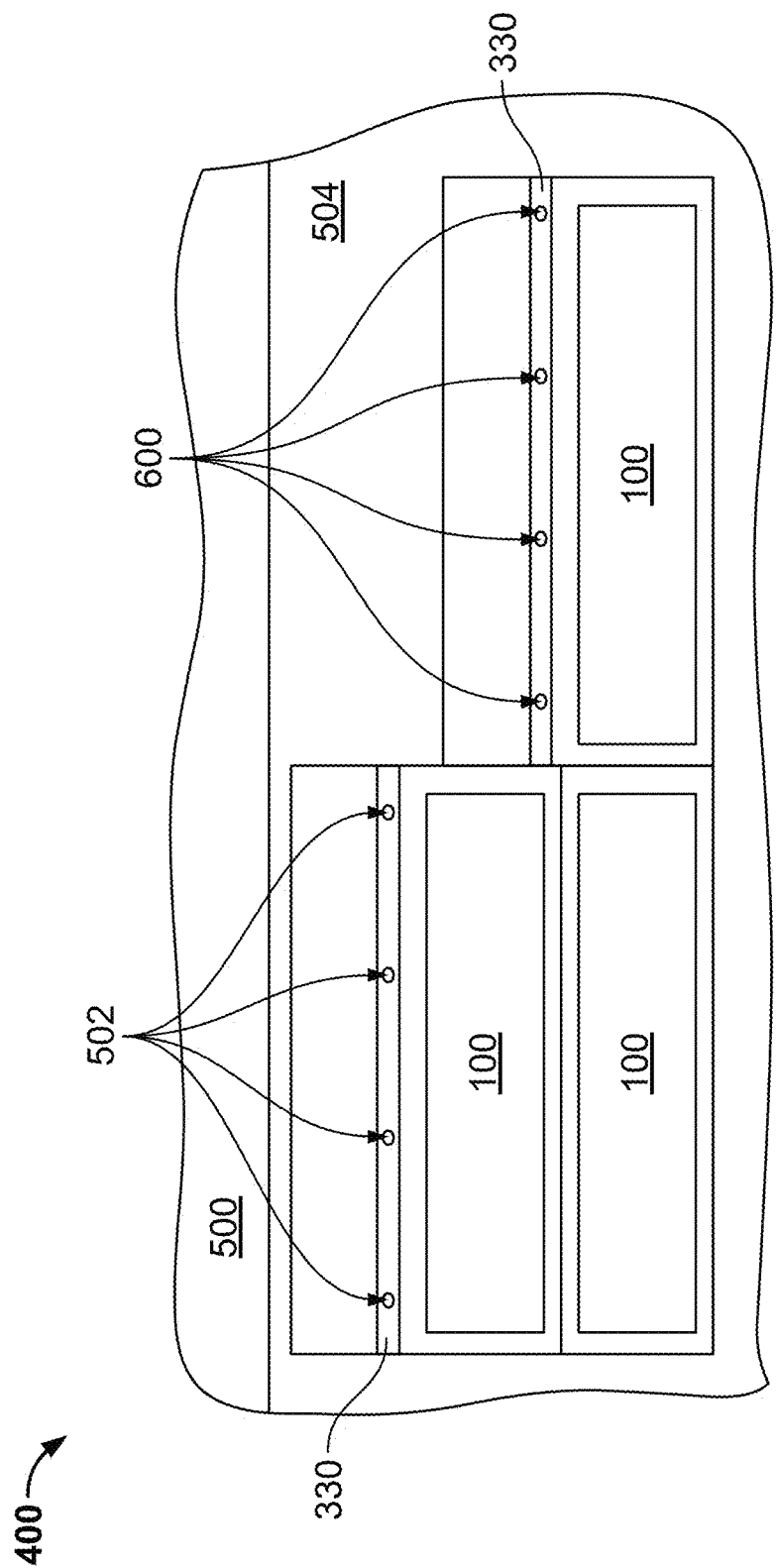
FIG. 15 is a schematic top view of a roofing system including a plurality of roofing modules, in accordance with some embodiments of the invention.

FIG. 15 is a schematic view of a roofing system including a plurality of roofing modules, installed above a roof deck, in accordance with some embodiments of the invention. As shown in the figure, the roofing system 400 includes a plurality of roofing modules 100 installed above a roof deck 500. As shown, one or more fasteners 502 penetrate the nail zones 330 of the roofing modules 100, and penetrate the roof deck 500, thereby to install the roofing modules 100 to the roof deck 500. In some embodiments, the roofing system 400 includes an underlayment 504 installed between the roofing modules and the roof deck 500. In some embodiments, the roofing system 400 does not include an underlayment installed between the roofing modules and the roof deck 500.

Figure 16:
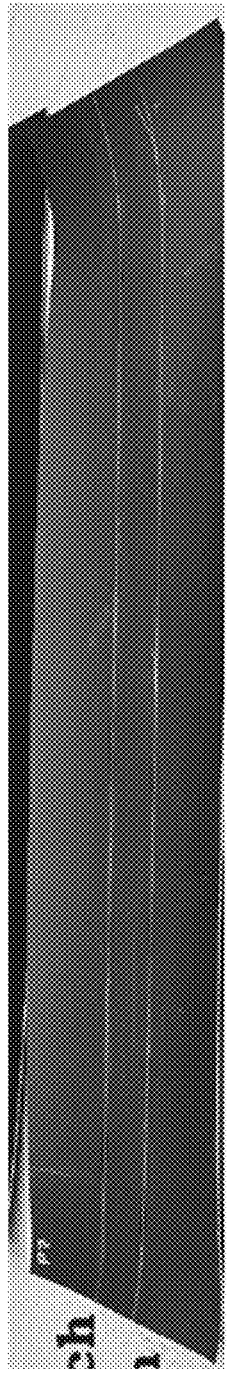
FIG. 16 is a photograph of a backsheet material, in accordance with embodiments of the invention.
Figure 17:
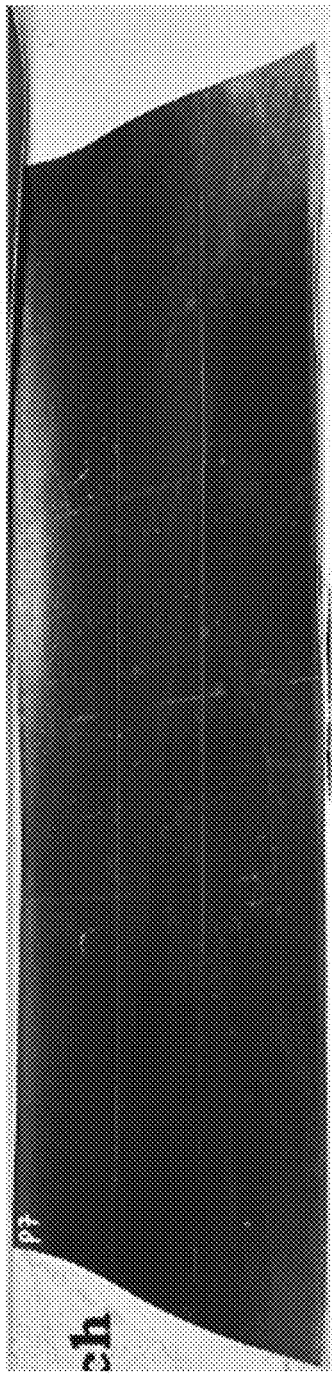
FIG. 17 is a photograph of the backsheet material of FIG. 16, over which a top layer has been laminated, in accordance with some embodiments of the invention.

FIG. 16 is a photograph of a backsheet material including two longitudinal grooves—a grooved backsheet material—in accordance with embodiments of the invention. FIG. 17 is a photograph of the grooved backsheet material over which a top layer has been laminated, in accordance with some embodiments of the invention. As shown, the longitudinal grooves, and thus the nail zone therebetween, remains visible before and after lamination, such that the nail zone will be visible in a roofing module in accordance with the above-described embodiments of the invention. In some embodiments, the term "visible" means visible to a human eye without the aid of magnifying equipment.

Figure 18:
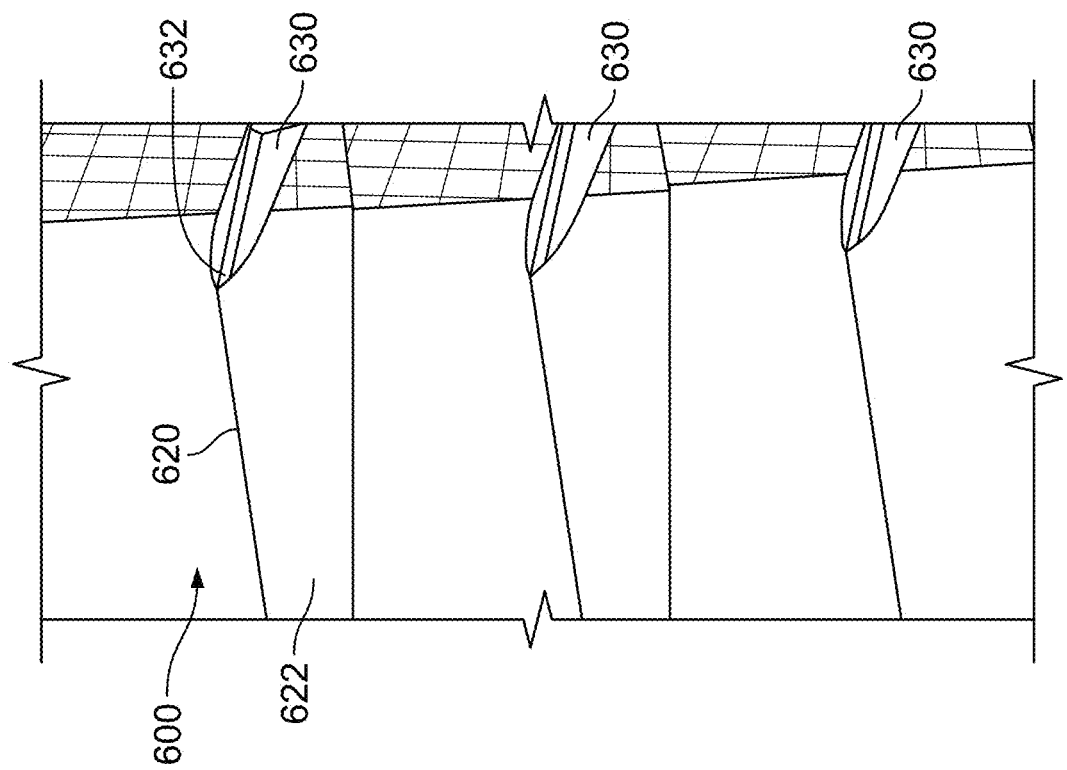
FIG. 18 is a photograph illustrating an embodiment of a method of forming a groove in a photovoltaic module.

FIG. 18 is a photograph of some embodiments of a method of forming one or more grooves 620 in a surface 622 of a roofing shingle 600 to form a nail zone. In some embodiments, the surface 622 is an upper surface of the roofing shingle 600. In some embodiments, the grooves 620 are formed by one or more tools 630. In some embodiments, the tool 630 includes a tip 632. In some embodiments, the tip 632 is a sharp tip. In some embodiments, the tip 632 is a pointed tip. In some embodiments, the tool 630 is a knife, a razor, or cutting tip. In some embodiments, the tool 630 creates the groove 620 by cutting, digging, or scratching.

Figure 19:
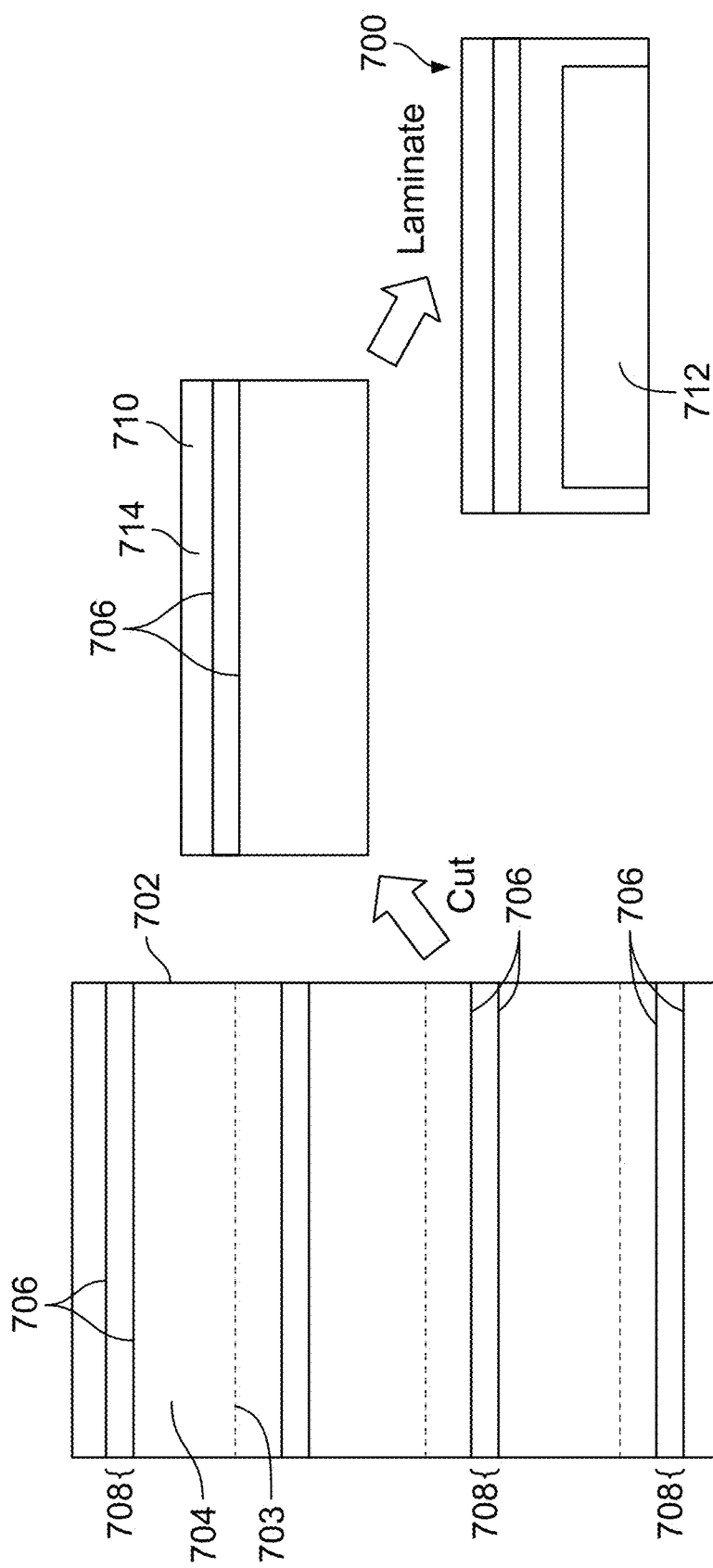
FIG. 19 illustrates an embodiment of a method of making a roofing module.

Referring to FIG. 19, in some embodiments, a method of forming one or more roofing shingles 700 with nail zones is illustrated. In some embodiments, the roofing shingle 700 is a photovoltaic shingle or solar shingle. In some embodiments, the roofing shingle 700 is a non-photovoltaic shingle. In some embodiments, a first sheet 702 is provided. In some embodiments, the first sheet 702 is composed of a polymer. In some embodiments, the first sheet 702 is composed of one or more of ethylene propylene diene monomer (EPDM) rubber, polymethyl methacrylate (PMMA), polyethylene terephthalate (PET), ethylene tetrafluoroethylene (ETFE), thermoplastic polyolefin (TPO), and/or combinations of two or more thereof. In some embodiments, the first sheet 702 includes an upper surface 704. In some embodiments, one or more sets of grooves 706 are formed in the upper surface 704 of the first sheet 702. In some embodiments, the grooves 706 are formed by one or more of the instruments and/or methods as described herein. In some embodiments, each set of grooves 706 includes a pair of the grooves 706. In some embodiments, each pair of grooves 706 forms a nail zone 708. In some embodiments, the first sheet 702 is cut into dimensions at one or more cut lines 703 to form a plurality of backsheets 710. In some embodiments, the first sheet 702 is cut into desired dimensions such that one portion of each of the backsheets 710 is configured to receive other layers of the roofing shingle 700, such as a layer of one or more solar cells 712, and another portion of each of the backsheets 710 is a headlap portion 714. In some embodiments, the headlap portion 714 includes the nail zone 708 formed by the grooves 706. In some embodiments, the grooves 706 are visible in the headlap portion 714 to a user, such as a roofing installer.

In some embodiments, the backsheet 710 undergoes lamination with one or more other layers to fabricate the roofing shingle 700. In some embodiments, lamination of the roofing shingle 700 occurs at 165° C. In some embodiments, lamination of the roofing shingle 700 occurs from 150° C. to 180° C. In some embodiments, lamination of the roofing shingle 700 occurs at a pressure of 14 psi. In some embodiments, lamination of the roofing shingle 700 occurs at a pressure of 10 psi to 20 psi. In some embodiments, lamination of the roofing shingle 700 occurs for 20 minutes. In some embodiments, lamination of the roofing shingle 700 occurs for 15 minutes to 25 minutes. In some embodiments, the grooves 706 do not disappear or diminish during lamination of the roofing shingle 700. In some embodiments, material of the backsheet 710 or other layers of the roofing shingle 700 do not fill in or substantially fill in the grooves 706 during lamination of the roofing shingle 700 so as to diminish, substantially diminish, or eliminate their visibility.

Figure 20B:
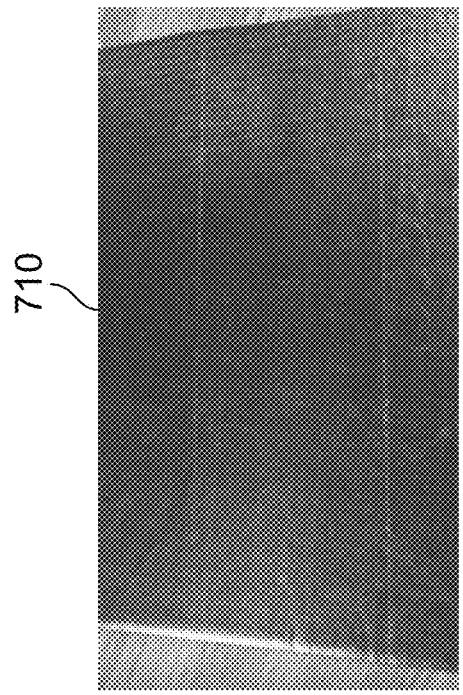
FIGS. 20A and 20B are photographs of some embodiments of backsheets including nail zones for roofing module.
Figure 20A:
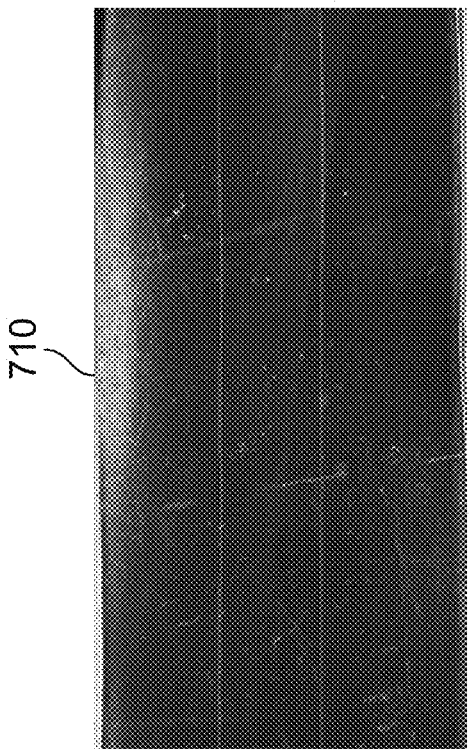

FIGS. 20A and 20B illustrate embodiments of backsheets 710 composed of TPO formulations with different base resins that were tested and evaluated to determine which include nail zone grooves that are visible after lamination. In some embodiments, referring to Table 1 below and FIG. 20A, the results indicate that a melting point within 2° C. of a lamination temperature of 165° C., coupled with a high flexural modulus of 480 MPa for P7 TPO with a base resin of Q402F resulted in visible grooves. In some embodiments, referring to Table 1 below and FIG. 20B, the results indicate that a melting point within 2° C. of the lamination temperature of 165° C., coupled with a lower flexural modulus of 150 MPa for P26 TPO with a base resin of Adflex Q200F resulted in visible grooves, but with lower visibility than that of the embodiment of FIG. 20A.

TABLE 1

| TPO Formulation | Base Resin | Resin melt point (° C.) | Resin Flexural Modulus (MPa) | Result |
| --- | --- | --- | --- | --- |
| P26 | Adflex Q200F | 163 | 150 | Visibility of Grooves |
| P7 | Q402F | 163 | 480 | Visibility of Grooves |

In some embodiments, a method includes:
obtaining a first sheet;
forming a first longitudinal groove in the first sheet;
forming a second longitudinal groove in the first sheet, the first longitudinal groove spaced apart from the second longitudinal groove to define a first nail zone between the first longitudinal groove and the second longitudinal groove;
forming a third longitudinal groove in the first sheet;
forming a fourth longitudinal groove in the first sheet, the third longitudinal groove spaced apart from the fourth longitudinal groove to define a second nail zone between the third longitudinal groove and the fourth longitudinal groove, wherein the first nail zone is spaced apart from the second nail zone;
cutting the sheet to form a first backsheet and a second backsheet, wherein the first backsheet includes the first nail zone, and wherein the second backsheet includes the second nail zone;
laminating a first solar cell with the first backsheet to form a first photovoltaic module, wherein the first photovoltaic module includes a headlap portion, and wherein the first nail zone is on the headlap portion; and
in some embodiments, laminating a second solar cell with the second backsheet to form a second photovoltaic module, wherein the second photovoltaic module includes a headlap portion, and where the second nail zone is on the headlap portion of the second photovoltaic module.

Figure 21:
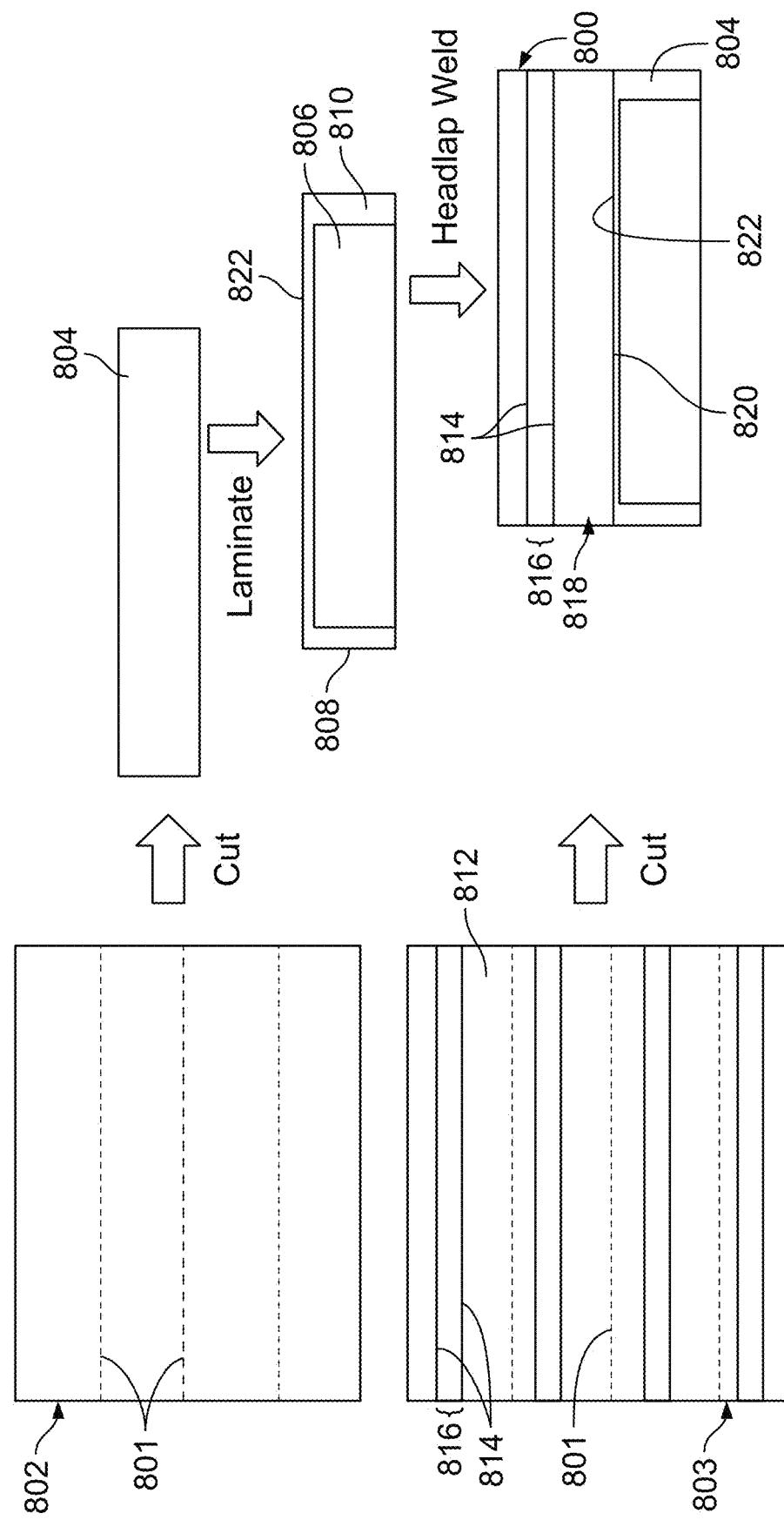
FIG. 21 illustrates an embodiment of a method of making a photovoltaic module.
Figure 22:
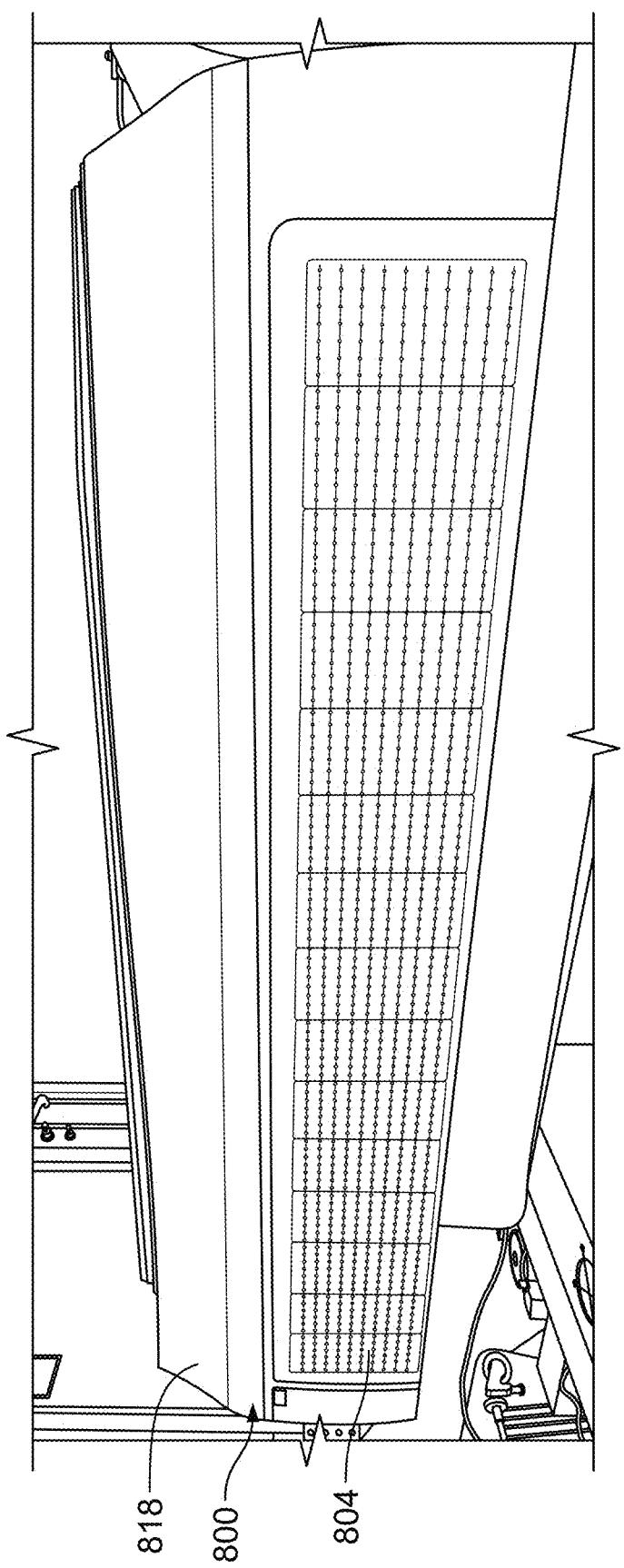
FIG. 22 is a photograph of some embodiments of a photovoltaic module.
Figure 23:
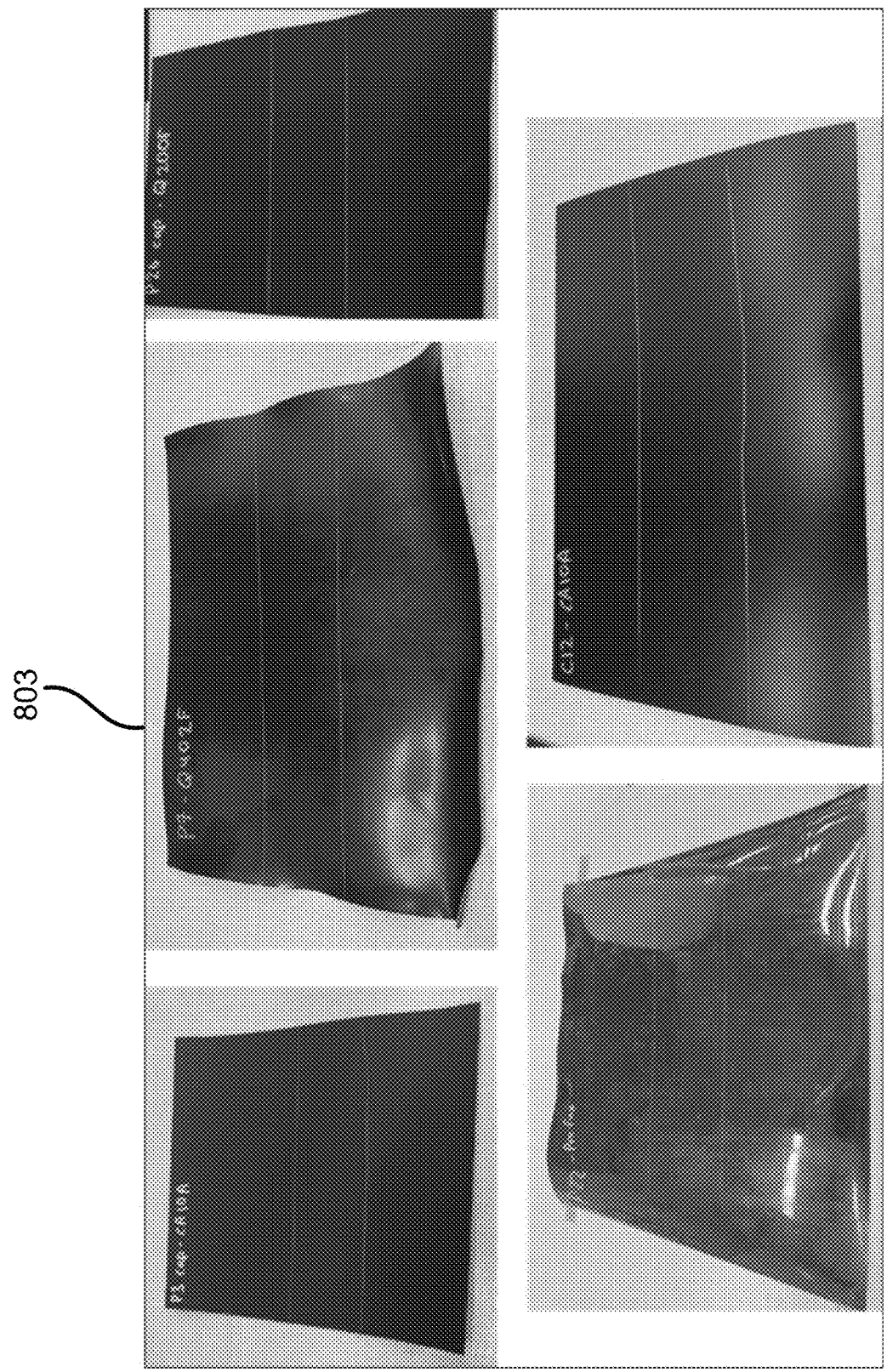
FIG. 23 are photographs of some embodiments of backsheets including nail zones for roofing modules.

Referring to FIGS. 21 through 23, in some embodiments, a method of forming one or more roofing shingles 800 with nail zones is illustrated. In some embodiments, the roofing shingle 800 is a photovoltaic shingle or solar shingle. In some embodiments, the roofing shingle 800 is a non-photovoltaic shingle. In some embodiments, a first sheet 802 and a second sheet 803 are provided. In some embodiments, the first sheet 802 is composed of a polymer. In some embodiments, the first sheet 802 is composed of one or more of ethylene propylene diene monomer (EPDM) rubber, polymethyl methacrylate (PMMA), polyethylene terephthalate (PET), ethylene tetrafluoroethylene (ETFE), thermoplastic polyolefin (TPO), and/or combinations of two or more thereof.

In some embodiments, the second sheet 803 is composed of a polymer. In some embodiments, the second sheet 803 is composed of one or more of ethylene propylene diene monomer (EPDM) rubber, polymethyl methacrylate (PMMA), polyethylene terephthalate (PET), ethylene tetrafluoroethylene (ETFE), thermoplastic polyolefin (TPO), and/or combinations of two or more thereof.

Referring to FIG. 23, in some embodiments, the second sheet 803 is composed of TPO with a P3 formulation and Hifax™ CA10A base resin. In some embodiments, the second sheet 803 is composed of TPO with a P26 formulation and an Adflex™ Q200F base resin. In some embodiments, the second sheet 803 is composed of TPO with a P7 formulation and Adflex™ Q402F base resin. In some embodiments, the second sheet 803 is composed of TPO with a P22 formulation and ProFax™ base resin. In some embodiments, the second sheet 803 is composed of TPO with a C12 formulation and Hifax™ CA10A base resin. In some embodiments, the second sheet 803 includes a dark color. In some embodiments, the second sheet 803 includes a black color. In some embodiments, the second sheet 803 includes a color that enables grooves 814 formed therein to be visible.

In some embodiments, the first sheet 802 and the second sheet 803 are separate from one another. In some embodiments, the first sheet 802 is cut to desired dimensions at one or more cut lines 801 to produce one or more base portions 804 that are configured to receive other layers of the roofing shingle 800, such as a layer of one or more solar cells 806 in a reveal portion, and side lap portions 808, 810. In some embodiments, the base portion 804 and the solar cells 806 are laminated.

In some embodiments, the second sheet 803 includes an upper surface 812. In some embodiments, one or more sets of grooves 814 are formed in the upper surface 812 of the second sheet 803. In some embodiments, the grooves 814 are formed by one or more of the instruments and methods as described herein. In some embodiments, each set of grooves 814 includes a pair of the grooves 814. In some embodiments, each pair of grooves 814 forms a nail zone 816. In some embodiments, the second sheet 803 is cut into dimensions at one or more cut lines 801 to form a plurality of headlap portions 818. In some embodiments, the headlap portion 818 is not laminated. In some embodiments, the grooves 814 of the nail zone 816 are not subjected to lamination.

In some embodiments, the headlap portion 818 is attached to the base portion 804. In some embodiments, a lower edge 820 of the headlap portion 818 is attached to an upper edge 822 of the base portion 804. In some embodiments, the headlap portion 818 is attached to the base portion 804 by heat pressure. In some embodiments, the headlap portion 818 is attached to the base portion 804 by welding. In some embodiments, the headlap portion 818 is attached to the base portion 804. In some embodiments, the headlap portion 818 is attached to the base portion 804 by ultrasonic welding. In some embodiments, the headlap portion 818 is attached to the base portion 804 by an adhesive. In some embodiments, the headlap portion 818 does not include a UV stabilizer. In some embodiments, the headlap portion 818 does not include a pigment. In some embodiments, the base portion 804 includes a pigment. In some embodiments, the base portion 804 includes a UV stabilizer.

In some embodiments, a method includes:
obtaining a first sheet;
forming a first longitudinal groove in the first sheet;
forming a second longitudinal groove in the first sheet, the first longitudinal groove spaced apart from the second longitudinal groove to define a first nail zone between the first longitudinal groove and the second longitudinal groove;
forming a third longitudinal groove in the first sheet;
forming a fourth longitudinal groove in the first sheet, the third longitudinal groove spaced apart from the fourth longitudinal groove to define a second nail zone between the third longitudinal groove and the fourth longitudinal groove, wherein the first nail zone is spaced apart from the second nail zone;
cutting the first sheet to form a first headlap portion and a second headlap portion, wherein the first headlap portion includes the first nail zone, and wherein the second headlap portion includes the second nail zone;
obtaining a second sheet;
laminating a first solar cell with the second sheet;
attaching the first headlap portion to the second sheet to form a first photovoltaic module;
in some embodiments, obtaining a third sheet;
laminating a second solar cell with the third sheet; and
attaching the second headlap portion to the third sheet to form a second photovoltaic module.

Variations, modifications, and alterations to embodiments of the present disclosure described above will make themselves apparent to those skilled in the art. All such variations, modifications, alterations, and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A system, comprising: a plurality of photovoltaic modules installed on a roof deck, each of the plurality of photovoltaic modules comprising: at least one solar cell, and a backsheet,
wherein the at least one solar cell is above the backsheet, and
wherein the backsheet includes a headlap portion,
wherein the headlap portion comprises a first surface, and a first longitudinal groove in the first surface and a second longitudinal groove in the first surface,
wherein the first longitudinal groove is spaced apart from the second longitudinal groove to define a nail zone between the first longitudinal groove and the second longitudinal groove, and
wherein each of the photovoltaic modules is configured to receive at least one fastener within the nail zone for installing the photovoltaic module to the roof deck, and wherein each of the plurality of photovoltaic modules does not include granules on at least the first surface of the headlap portion.

2. The system of claim 1, wherein a depth of at least one of the first longitudinal groove or the second longitudinal groove is 0.1 mm to 0.2 mm.

3. The system of claim 1, wherein a width of the nail zone between the first longitudinal groove and the second longitudinal groove is 3 cm to 6 cm.

4. The system of claim 1, wherein each of the first longitudinal groove and the second longitudinal groove extends from one end of the backsheet to an opposite end of the backsheet.

5. The system of claim 1, wherein the backsheet is composed of thermoplastic polyolefin (TPO).

6. The system of claim 1, wherein the headlap portion an integral portion of the backsheet.

7. The system of claim 1, wherein the backsheet includes a base portion, and wherein the headlap portion is attached to the base portion.

8. The system of claim 7, wherein the at least one solar cell and the base portion are laminated, and wherein the headlap portion is not laminated.

9. The system of claim 8, wherein the headlap portion does not include a pigment.

10. A photovoltaic module, comprising: at least one solar cell, and a backsheet, wherein the at least one solar cell is above the backsheet, wherein the backsheet comprises a headlap portion, wherein the headlap portion comprises a first surface, and a first longitudinal groove in the first surface and a second longitudinal groove in the first surface, wherein the first longitudinal groove is spaced apart from the second longitudinal groove on the backsheet to define a nail zone between the first longitudinal groove and the second longitudinal groove, and wherein the nail zone is configured to receive at least one fastener that penetrates the photovoltaic module to secure the photovoltaic module to a roof deck, and wherein each of the plurality of photovoltaic modules does not include granules on at least the first surface of the headlap portion.

11. The photovoltaic module of claim 10, wherein the backsheet comprises thermoplastic polyolefin (TPO).

12. The photovoltaic module of claim 10, wherein a depth of at least one of the first longitudinal groove or the second longitudinal groove is 0.1 mm to 0.2 mm.

13. The photovoltaic module of claim 10, wherein a width of the nail zone between the first longitudinal groove and the second longitudinal groove is 3 cm to 6 cm.

14. The photovoltaic module of claim 10, wherein each of the first longitudinal groove and the second longitudinal groove extends from one end of the backsheet to an opposite end of the backsheet.

15. The photovoltaic module of claim 10, wherein the headlap portion an integral portion of the backsheet.

16. The photovoltaic module of claim 10, wherein the backsheet includes a base portion, and wherein the headlap portion is attached to the base portion.

17. The photovoltaic module of claim 16, wherein the at least one solar cell and the base portion are laminated, and wherein the headlap portion is not laminated.

18. The photovoltaic module of claim 16, wherein the headlap portion does not include a pigment.

19. A method, comprising:

obtaining a first sheet wherein the first sheet includes a first surface;

forming a first longitudinal groove in the first surface of the first sheet;

forming a second longitudinal groove in the first surface of the first sheet, the first longitudinal groove spaced apart from the second longitudinal groove to define a first nail zone between the first longitudinal groove and the second longitudinal groove; forming a third longitudinal groove in the first surface of the first sheet; forming a fourth longitudinal groove in the first surface of the first sheet, the third longitudinal groove spaced apart from the fourth longitudinal groove to define a second nail zone between the third longitudinal groove and the fourth longitudinal groove, wherein the first nail zone is spaced apart from the second nail zone;

cutting the first sheet to form a first backsheet and a second backsheet, wherein the first backsheet includes the first nail zone, and wherein the second backsheet includes the second nail zone; and laminating a first solar cell with the first backsheet to form a first photovoltaic module, wherein the first photovoltaic module includes a headlap portion, and wherein the first nail zone is on the headlap portion, and wherein each of the plurality of photovoltaic modules does not include granules on at least the first surface of the headlap portion.

20. The method of claim 19, further comprising laminating a second solar cell with the second backsheet to form a second photovoltaic module, wherein the second photovoltaic module includes a headlap portion, and where the second nail zone is on the headlap portion of the second photovoltaic module.

* * * * *